(12) United States Patent
Itsuki

(10) Patent No.: US 12,097,082 B2
(45) Date of Patent: Sep. 24, 2024

(54) DRILL ASSISTANCE DEVICE, SCREW GUIDE DEVICE, AND ORTHODONTIC TOOL INSTALLATION-ASSISTING DEVICE SET

(71) Applicants: Yasuhiro Itsuki, Tokyo (JP); OKADA MEDICAL SUPPLY CO., LTD., Tokyo (JP)

(72) Inventor: Yasuhiro Itsuki, Tokyo (JP)

(73) Assignees: Yasuhiro Itsuki, Tokyo (JP); OKADA MEDICAL SUPPLY CO., LTD., Tokyo (JP)

( * ) Notice: Subject to any disclaimer, the term of this patent is extended or adjusted under 35 U.S.C. 154(b) by 0 days.

(21) Appl. No.: 18/036,891

(22) PCT Filed: Nov. 16, 2021

(86) PCT No.: PCT/JP2021/042011
§ 371 (c)(1),
(2) Date: May 15, 2023

(87) PCT Pub. No.: WO2022/107744
PCT Pub. Date: May 27, 2022

(65) Prior Publication Data
US 2024/0016574 A1    Jan. 18, 2024

(30) Foreign Application Priority Data

Nov. 19, 2020 (JP) ................................ 2020-192643
Jul. 9, 2021 (JP) ................................ 2021-114134

(51) Int. Cl.
*A61C 1/08* (2006.01)
*A61C 1/00* (2006.01)

(52) U.S. Cl.
CPC ............ *A61C 1/084* (2013.01); *A61C 1/0069* (2013.01); *A61C 1/085* (2013.01)

(58) Field of Classification Search
CPC ....... A61C 1/082; A61C 1/084; A61C 1/0069; A61C 1/085; A61C 8/0089
(Continued)

(56) References Cited

U.S. PATENT DOCUMENTS

| 11,160,640 B2 * | 11/2021 | Itsuki | ........................ A61C 7/00 |
| 2013/0071811 A1 * | 3/2013 | Groscurth | ............ A61C 8/0089 |
| | | | 433/75 |

(Continued)

FOREIGN PATENT DOCUMENTS

| BR | 102014025759 | 7/2016 |
| JP | H10507387 | 7/1998 |

(Continued)

OTHER PUBLICATIONS

"International Search Report (Form PCT/ISA/210) of PCT/JP2021/042011", mailed on Jan. 25, 2022, with English translation thereof, pp. 1-6.

(Continued)

*Primary Examiner* — Matthew M Nelson
(74) *Attorney, Agent, or Firm* — JCIPRNET

(57) ABSTRACT

An aspect of the present invention is a drill assistance device comprising: a drill guide device that serves as a guide when forming a plurality of holes from a curved surface of a hard palate having the curved surface; and a guide sleeve that is fitted in the drill guide device in an attachable and detachable manner. With this device, it is possible to easily and accurately perform the hole making with a drill and the implant of a screw in an oral cavity. The drill guide device comprises: a guide frame unit that is formed by connecting a plurality of tubular guide frames to each other; a fixing member to be capped on a tooth of a patient; a connecting portion that connects the guide frame unit and the fixing member and determines arrangement of the guide frame unit (Continued)

on the curved surface; and at least one protruding portion that holds the guide sleeve inserted in any of holes inside the guide frames. The guide sleeve comprises: a tubular sleeve main body having an inner diameter that allows the drill to be inserted and an outer diameter that allows the sleeve main body to be inserted in any of the guide frames; a water injection slit that is provided in the sleeve main body; and projecting portions that are each fitted in at least one recessed portion provided in the at least one protruding portion when the sleeve main body is inserted in any of the holes of the guide frames.

11 Claims, 18 Drawing Sheets

(58) Field of Classification Search
USPC .......................................................... 433/76
See application file for complete search history.

(56) References Cited

U.S. PATENT DOCUMENTS

| | | | |
|---|---|---|---|
| 2015/0133956 A1* | 5/2015 | Dayan | A61B 90/11 606/129 |
| 2015/0351866 A1* | 12/2015 | Thompson, Jr. | A61B 34/10 433/173 |
| 2016/0038254 A1* | 2/2016 | Prestipino | A61C 8/0089 433/174 |
| 2017/0304005 A1* | 10/2017 | Maino | A61C 1/084 |
| 2019/0374315 A1 | 12/2019 | Itsuki | |
| 2021/0128274 A1* | 5/2021 | Borzov | A61B 6/032 |
| 2021/0386527 A1* | 12/2021 | Choi | A61C 9/0046 |
| 2022/0233281 A1* | 7/2022 | Schmid | A61C 7/12 |
| 2024/0016574 A1* | 1/2024 | Itsuki | A61C 7/10 |
| 2024/0023978 A1* | 1/2024 | Lozada | A61C 1/084 |

FOREIGN PATENT DOCUMENTS

| | | |
|---|---|---|
| JP | 2001187071 | 7/2001 |
| JP | 2004097787 | 4/2004 |
| JP | 2004136134 | 5/2004 |
| JP | 2004174278 | 6/2004 |
| JP | 2006314419 | 11/2006 |
| JP | 2006341067 | 12/2006 |
| JP | 2009513228 | 4/2009 |
| JP | 2009531098 | 9/2009 |
| JP | 2009285358 | 12/2009 |
| JP | 2011519299 | 7/2011 |
| JP | 2013510654 | 3/2013 |
| JP | 2014168553 | 9/2014 |
| JP | 2019504719 | 2/2019 |
| KR | 20170097875 | 8/2017 |
| KR | 102088353 | 3/2020 |
| WO | 2018012735 | 1/2018 |

OTHER PUBLICATIONS

"Office Action of Japan Counterpart Application No. 2020-192643", issued on Jan. 19, 2021, with English translation thereof, pp. 1-7.
"Office Action of Japan Counterpart Application No. 2020-192643", issued on Mar. 23, 2021, with English translation thereof, pp. 1-9.
"Office Action of Japan Counterpart Application No. 2021-114134", issued on Oct. 12, 2021, with English translation thereof, pp. 1-9.
"Notice of Allowance of Japan Counterpart Application No. 2021-114134", issued on Nov. 9, 2021, with English translation thereof, pp. 1-6.
"Search Report of Europe Counterpart Application", issued on May 3, 2024, p. 1-p. 5.
"Office Action of Europe Counterpart Application", issued on May 15, 2024, p. 1-p. 6.

* cited by examiner

DRILL ASSISTANCE DEVICE, SCREW GUIDE DEVICE, AND ORTHODONTIC TOOL INSTALLATION-ASSISTING DEVICE SET

TECHNICAL FIELD

The present invention relates to a drill assistance device, a screw guide device, and an orthodontic tool installation-assisting device set that are used when installing a screw in an implant device for orthodontics into an oral cavity.

BACKGROUND ART

In orthodontics, teeth are aligned by applying a three-dimensional orthodontic force such as front-back or right-left force, tilting force, or rotational force to one or more of the teeth to be moved. Applying the orthodontic force to the teeth includes fixing brackets to the teeth, installing a wire or the like between a bracket for a reference tooth and a bracket for a tooth to be moved, and tightening the wire. By adjusting the wire routing, tightening method, etc., the orthodontic force is applied in the desired direction.

In an implant device for orthodontics, a screw or anchor is implanted in a bone in the oral cavity, and the screw or the like is used as a fixed end to apply an orthodontic force to a desired tooth. A plate, a wire, or the like is fixed to the implanted screw or the like, and the orthodontic force is applied to the tooth through the plate, wire, or the like (see, for example, Patent Documents 1 to 6). Another configuration is also disclosed, in which a fixing portion as a support for orthodontics is fixed to a jawbone and an exposed portion is exposed in the oral cavity (see, for example, Patent Documents 7 and 8).

PRIOR ART DOCUMENTS

Patent Documents

[Patent Document 1] Japanese translation of PCT international application, No. 2011-519299A
[Patent Document 2] Japanese translation of PCT international application, No. 2009-513228A
[Patent Document 3] JP2006-314419A
[Patent Document 4] JP2004-97787A
[Patent Document 5] JP2001-187071A
[Patent Document 6] Japanese translation of PCT international application, No. 10-507387
[Patent Document 7] JP2004-174278A
[Patent Document 8] JP2004-136134A
[Patent Document 9] JP2009-285358A
[Patent Document 10] JP2014-168553A
[Patent Document 11] US2015/0351866A
[Patent Document 12] US2016/0038254A

DISCLOSURE OF THE INVENTION

Problems to be Solved by the Invention

Installation of an orthodontic tool imposes a considerable burden on patients. In addition, reduction of the treatment burden on doctors who perform treatment leads to shortening of the treatment time and proper and stable treatment. This can reduce the burden not only on doctors but also on patients. Among orthodontic treatments, the treatment of implanting a screw or the like in a bone in the oral cavity is necessary in implant devices, and the implant devices are thus required to reduce the burden and have a high degree of certainty. In particular, the hard palate is curved in a concave shape, and it is therefore difficult to accurately set the direction of hole making with a drill. In addition, it is highly challenging to drill a hole at an appropriate position and depth corresponding to the shape of the oral cavity and the state of the teeth, which differ from patient to patient, and to implant the screw.

Objects of the present invention include providing a drill assistance device, a screw guide device, and an orthodontic tool installation-assisting device set with which it is possible to easily and accurately perform the hole making with a drill and the implant of screws conducted in an implant device for orthodontics when installing the screws in an oral cavity.

Means for Solving the Problems

An aspect of the present invention is a drill assistance device comprising: a drill guide device that serves as a guide for a drill when forming a plurality of holes from a curved surface of a hard palate having the curved surface; and a guide sleeve that is fitted in the drill guide device in an attachable and detachable manner.

The drill guide device comprises: a guide frame unit that is arranged on the curved surface and formed by connecting a plurality of tubular guide frames to each other; a fixing member to be capped on a tooth of a patient; a connecting portion that connects the guide frame unit and the fixing member and determines arrangement of the guide frame unit on the curved surface with reference to the tooth; and at least one protruding portion that protrudes from at least one portion of the guide frame unit on a side opposite to a side facing the curved surface and holds the guide sleeve inserted in any of holes inside the guide frames.

The guide sleeve comprises: a tubular sleeve main body having an inner diameter that allows the drill to be inserted and an outer diameter that allows the sleeve main body to be inserted in any of the holes of the guide frames; a water injection slit that is provided in a direction in which the sleeve main body extends; and projecting portions that are provided on an outer peripheral surface of the sleeve main body and are each fitted in at least one recessed portion provided in the at least one protruding portion when the sleeve main body is inserted in any of the holes of the guide frames.

The sum of the number of the at least one recessed portion and the number of the projecting portions is three or more, and when the guide sleeve is inserted in any of the guide frames, one of the at least one recessed portion and one of the projecting portions can be fitted to each other so that the water injection slit faces an oral cavity vestibular side.

According to such a configuration, the guide device and the guide sleeve are not integrated, so that the drill can be inserted into the guide sleeve before the guide sleeve is attached to the guide frame, and in this state the guide sleeve can be inserted into the hole of the guide frame. By fitting the recessed portion and the projecting portion to each other, it is possible to achieve a height with the guide sleeve to stably guide the drill while suppressing the influence of the height of the guide frame. Moreover, the water injection slit of the guide sleeve faces the oral cavity vestibular side, and water can therefore be easily injected from the opening side of the mouth.

In the above drill assistance device, the projecting portions are preferably provided on the sleeve main body of at least one of a plurality of guide sleeves, and even when the guide sleeve is inserted in any of the plurality of guide frames, one of the projecting portions is preferably fitted in of the recessed portion of the protruding portion without axially rotating the guide sleeve.

Through this configuration, even when the guide sleeve is inserted in any of the plurality of guide frames, the projecting portion can be fitted in the recessed portion without changing the orientation of the guide sleeve.

In the above drill assistance device, the protruding portion is preferably individually provided so as to be associated with one of the plurality of guide frames, and preferably the protruding portion does not interfere with insertion of the guide sleeve into the guide frames that are not associated with the protruding portion.

Through this configuration, upon insertion of the guide sleeve into the hole of the guide frame, the guide sleeve can be inserted into the guide frame without interfering with the protruding portions of other guide frames even when the protruding portion is individually provided so as to be associated with one of the plurality of guide frames.

In the above drill assistance device, provided that when the guide frame unit is viewed from above, the guide frame provided at a leftmost position is a first guide frame, the guide frame provided at a rightmost position is a second guide frame, the guide frame other than the first guide frame and the second guide frame is a third guide frame, the protruding portion provided on the first guide frame is a first protruding portion, the protruding portion provided on the second guide frame is a second protruding portion, and the protruding portion provided on the third guide frame is a third protruding portion, the first protruding portion may be arranged on a left side of the first guide frame, the second protruding portion may be arranged on a right side of the second guide frame, and the third protruding portion may be arranged on a far side of the third guide frame.

This allows the protruding portions of the first guide frame, the second guide frame, and the third guide frame to be arranged apart from each other, and interference when inserting the guide sleeve can be suppressed.

In the above drill assistance device, the protruding portion may has a shared protruding portion associated with two or more of the guide frames. This allows the number of the protruding portions to be smaller than the number of the guide frames.

In the above drill assistance device, the recessed portion of the shared protruding portion may be able to be fitted to different ones of the projecting portions. Additionally or alternatively, in the above drill assistance device, the shared protruding portion may have two or more recessed portions. Additionally or alternatively, in the above drill assistance device, the projecting portions may have one or more shared projecting portions that can be fitted to two or more recessed portions.

In the above drill assistance device, the guide sleeve may have two or more of the projecting portions, and all recessed portions provided on the guide frame unit may each be able to be fitted to any of the two or more of the projecting portions. This allows any of the projecting portions to be fitted into the recessed portion without changing the orientation of the guide sleeve.

Another aspect of the present invention is a screw guide device that serves as a guide for implanting a screw in a pilot hole provided in a curved surface of a hard palate having the curved surface. The screw guide device comprises: a guide frame unit that is arranged on the curved surface and has a tubular guide frame; a fixing member to be capped on a tooth of a patient; a connecting portion that connects the guide frame unit and the fixing member and determines arrangement of the guide frame unit on the curved surface with reference to the tooth; one or more protruding portions that protrude from portions of the guide frame unit on a side opposite to a side facing the curved surface and restrict an implanting depth of the screw in the hard palate, the screw being implanted through a hole inside the guide frame; and a screw retainer comprising: a retainer main body that has a tubular fitting portion for fitting the screw from a tip end side and can be inserted into the hole of the guide frame in a state in which the screw is fitted in the fitting portion; and a flange portion that is provided from a position midway in a length direction of the retainer main body so as to be able to come into contact with the protruding portion.

In this screw guide device, a projection height of the protruding portion is set so that the screw is implanted in the hard palate at a predetermined depth when the flange portion of the screw retainer and the protruding portion come into contact with each other and fitting between the fitting portion and the screw is released to stop implant of the screw based on rotation of the retainer main body.

According to such a configuration, the screw is implanted into the hard palate through inserting the screw held by the screw retainer into the hole of the guide frame and rotating the screw together with the retainer main body. When the screw is implanted to a predetermined depth, the flange portion of the screw retainer comes into contact with the protruding portion of the guide frame, the screw retainer is restricted at that position, and only the screw is implanted. Eventually, the fitting between the screw and the fitting portion is released to stop implant of the screw, and only the screw retainer can be removed.

Still another aspect of the present invention is an orthodontic tool installation-assisting device set comprising: a guide device that serves as a guide for a drill that forms a plurality of pilot holes by drilling a curved surface of a hard palate having the curved surface, the guide device also serving as a guide that implants a screw in each of the plurality of pilot holes; a guide sleeve that is fitted in the guide device in an attachable and detachable manner; and a screw retainer.

The guide device comprises: a guide frame unit that is arranged on the curved surface and formed by connecting a plurality of tubular guide frames to each other; a fixing member to be capped on a tooth of a patient; a connecting portion that connects the guide frame unit and the fixing member and determines arrangement of the guide frame unit on the curved surface with reference to the tooth; and at least one protruding portion that protrudes from at least one portion of the guide frame unit on a side opposite to a side facing the curved surface and holds the guide sleeve inserted in any of holes inside the guide frames.

The guide sleeve comprises: a tubular sleeve main body having an inner diameter that allows the drill to be inserted and an outer diameter that allows the sleeve main body to be inserted in any of the holes of the guide frames; a water injection slit that is provided in a direction in which the sleeve main body extends; and projecting portions that are provided on an outer peripheral surface of the sleeve main body and are each fitted in at least one recessed portion provided in the at least one protruding portion when the sleeve main body is inserted in any of the holes of the guide frames.

In this orthodontic tool installation-assisting device set, the sum of the number of the at least one recessed portion and the number of the projecting portions is three or more, and when the guide sleeve is inserted in any of the guide frames, one of the at least one recessed portion and one of the projecting portions can be fitted to each other so that the water injection slit faces an oral cavity vestibular side.

The screw retainer comprises: a retainer main body that has a tubular fitting portion for fitting the screw from a tip end side and can be inserted into any of the holes of the guide frames in a state in which the screw is fitted in the fitting portion; and a flange portion that is provided from a position midway in a length direction of the retainer main body so as to be able to come into contact with the protruding portion. A projection height of the protruding portions is set so that the screw is implanted in the hard palate at a predetermined depth when the flange portion of the screw retainer and the protruding portion of the guide device come into contact with each other and fitting between the fitting portion and the screw is released to stop implant of the screw based on rotation of the retainer main body.

According to such a configuration, the drill is guided by inserting the guide sleeve into the guide frame of the guide device, and the curved surface of the hard palate is drilled to form a plurality of pilot holes. In this operation, by fitting the recessed portion and the projecting portion to each other, it is possible to achieve a height with the guide sleeve to stably guide the drill while suppressing the influence of the height of the guide frame. Moreover, the water injection slit of the guide sleeve faces the oral cavity vestibular side, and water can therefore be easily injected from the opening side of the mouth.

Moreover, after the pilot hole is formed, the guide device is used as it is without removing it, and the screw is inserted into the hole of the guide frame and implanted in the hard palate. In this operation, the screw is implanted into the hard palate through inserting the screw held by the screw retainer into the hole of the guide frame and rotating the screw together with the retainer main body. When the screw is implanted to a predetermined depth, the flange portion of the screw retainer comes into contact with the protruding portion the guide frame, the screw retainer is restricted at that position, and only the screw is implanted. Eventually, the fitting between the screw and the fitting portion is released to stop implant of the screw, and only the screw retainer can be removed.

Yet another aspect of the present invention is a guide device used for implanting a plurality of screws in an oral cavity. The guide device comprises: a guide frame unit formed by connecting a plurality of tubular guide frames that are arranged on implanting positions of the screws; fixing members to be capped on teeth of a patient; and connecting portions that connect the guide frame unit and the fixing members and determine arrangement of the guide frame unit in the oral cavity with reference to the teeth. Each of the guide frames is provided with a non-annular protruding portion that sets the insertion depth of a member to be inserted into a hole inside the guide frame so that the protruding portion protrudes on the side opposite to the side of the guide frame that comes into contact with the oral cavity.

According to such a configuration, when inserting a member (the guide sleeve or screw attached to the drill) into the hole of the guide frame, the non-annular protruding portion allows the treatment to be performed without interfering with other guide frames or protruding portions, and the insertion depth of the member can be stabilized.

In the above guide device, the fixing members preferably have a plurality of tooth-shaped recessed portions that are formed to match the shapes of respective molars of the patient and capped on the molars. This allows the guide frame to be stably positioned with the tooth-shaped recessed portions formed to match the shapes of the molars.

In an preferred embodiment of the above guide device, the plurality of tooth-shaped recessed portions may have a first tooth-shaped recessed portion, a second tooth-shaped recessed portion, and a third tooth-shaped recessed portion, the first tooth-shaped recessed portion may be capped on the right molar, the second tooth-shaped recess may be capped on the left molar, and the third tooth-shaped recess may be capped on the right premolar. This allows the three tooth-shaped recessed portions to increase the sense of stability, and two of the three may be capped on the right-side molars thereby to easily ensure a space on the left side (right side viewed from the practitioner) for entering a treatment tool (such as a space for entering the drill device).

Still yet another aspect of the present invention is a guide sleeve for a drill used in the above guide device. The guide sleeve comprises: a tubular sleeve main body to be inserted in a hole of a guide frame; a water injection slit that is provided in a direction in which the sleeve main body extends; and a projecting portion that is provided on an outer peripheral surface of the sleeve main body. The projecting portion comes into contact with a protruding portion of the guide frame, and the insertion depth of the sleeve main body into the hole of the guide frame is thereby adjusted.

According to such a configuration, by fitting the sleeve main body to the tip portion of the drill and inserting the sleeve main body into the hole of the guide frame, it is possible to stabilize the angle of the drill with the guide frame while ensuring a space for entering the drill. In this operation, even when the sleeve main body is inserted into any guide frame hole with the water injection slit oriented in a fixed direction, one of the plurality of projecting portions of the sleeve main body comes into contact with the protruding portion of the guide frame, and guide of the drill in the depth direction can be performed corresponding to each guide frame.

A further aspect of the present invention is a drill device to which the above guide sleeve is attached. The drill device comprises: a drill that is composed of a drill blade extending in a hole making direction and a shaft body provided consecutively with the drill blade; a holding mechanism that holds the shaft body of the drill; a rotating operation unit having a rotating mechanism that rotates the drill together with the holding mechanism; and a guide sleeve in a state in which the drill is inserted in a sleeve main body.

According to such a configuration, by inserting the drill into the guide frame of the guide device together with the guide sleeve in a state in which the drill is inserted in the guide sleeve, it is possible to accurately and stably set the direction and depth of hole making with the drill while ensuring a space for entering the drill device in the oral cavity.

A still further aspect of the present invention is a screw retainer used in the above guide device. The screw retainer comprises: a retainer main body that has a fitting portion on a tip end side for fitting a screw and is inserted into a hole of the guide frame in a state in which the screw is fitted in the fitting portion; and a flange portion that is provided from a position midway in a length direction of the retainer main body so as to be able to come into contact with the protruding portion.

According to such a configuration, in a state in which the screw is fitted in the fitting portion of the retainer main body, the screw is inserted in the hole of the guide frame and implanted in the oral cavity by axially rotating the retainer main body. In this operation, when the screw is implanted to a predetermined depth, the flange portion comes into contact with the protruding portion to stop the movement of the retainer main body, and only the screw is implanted. Eventually, when the screw is released from the fitting portion, the implanting depth of the screw is determined.

Effect of the Invention

According to the present invention, there can be provided a drill assistance device, a screw guide device, and an orthodontic tool installation-assisting device set with which it is possible to easily and accurately perform the hole making with a drill and the implant of screws conducted in an implant device for orthodontics when installing the screws in an oral cavity.

BEST MODES FOR CARRYING OUT THE INVENTION

Figure 1:
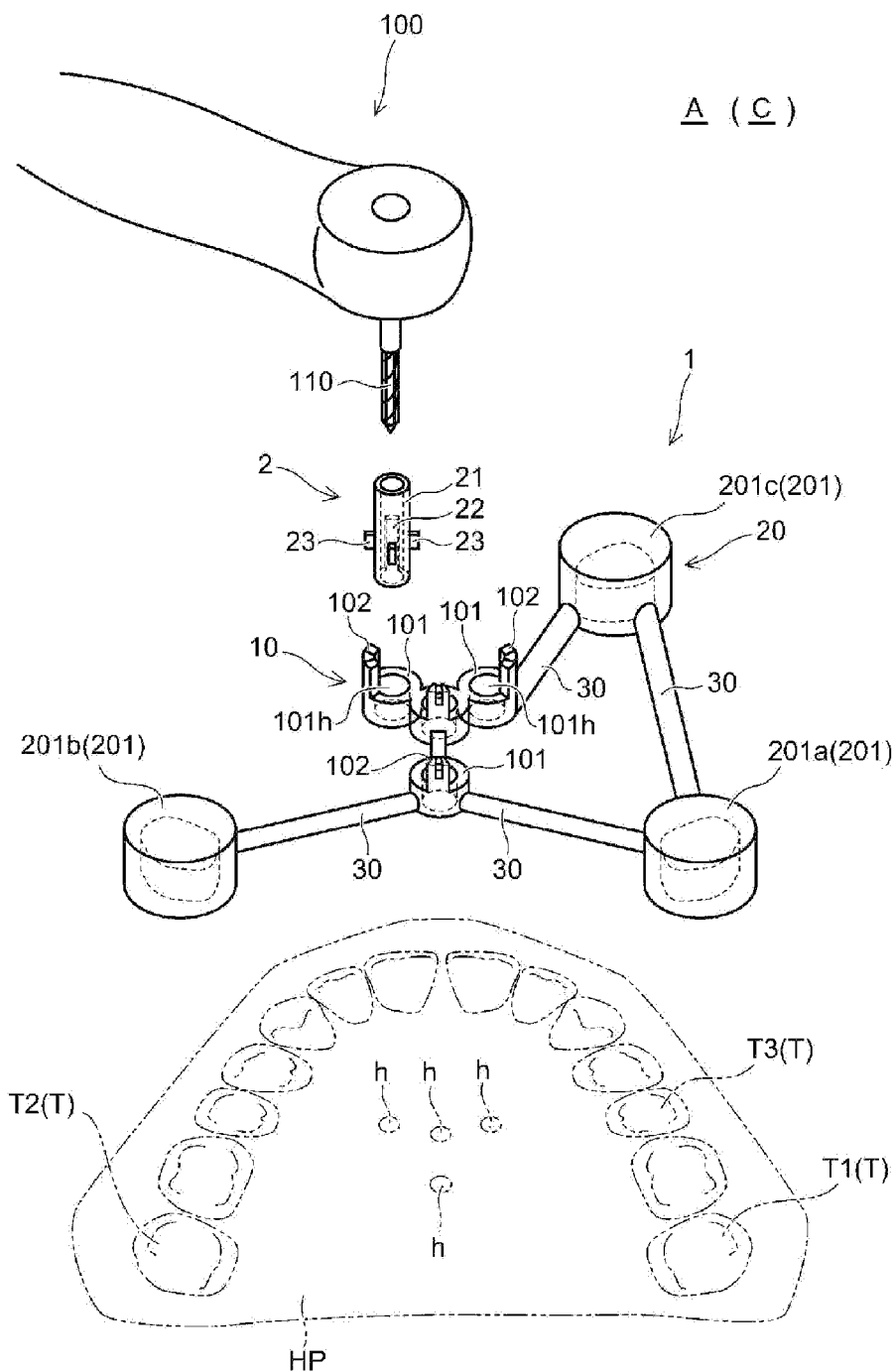
FIG. 1 is a perspective diagram exemplifying the configuration of a guide device according to an embodiment of the present invention.

Hereinafter, one or more embodiments of the present invention will be described with reference to the drawings. In the following description, the same members are denoted with the same reference numerals and the description of members once explained will be omitted.

(Configuration of Guide Device)

FIG. 1 is a perspective diagram illustrating the configuration of a guide device according to the present embodiment.

A guide device 1 according to the present embodiment is used as a guide when making holes h in an oral cavity with a drill device 100, and also as a guide for implanting a plurality of screws 5 (see FIG. 9 described later) in the holes h.

For descriptive purposes, the present embodiment will be described for an exemplary case in which the holes h are drilled from a hard palate HP to a maxillary bone using the drill device 100. The direction away from the surface of the hard palate HP in which the holes h are to be drilled is defined as an upward direction (upper side) while the direction of approaching the surface of the hard palate HP is defined as a downward direction (lower side). The right-left direction and the directions represented by the far side and near side are defined as those with reference to the patient.

The guide device 1 includes a guide frame unit 10, fixing members 20, and connecting portions 30. The guide frame unit 10 is configured such that a plurality of tubular guide frames 101 arranged on the implanting positions of the screws 5 are connected to each other. In the present embodiment, four guide frames 101 are provided corresponding to the positions of, for example, four holes h to be drilled in the hard palate HP, and these four guide frames 101 are provided in a state of being connected to each other.

The fixing members 20 are members that are capped on teeth T of the patient. In the present embodiment, the fixing members 20 have tooth-shaped recessed portions 201 that are formed to match the shapes of given teeth T of the patient. By capping the tooth-shaped recessed portions 201 on the corresponding teeth T, the fixing members 20 are accurately fixed with reference to the teeth T of the patient. To stably fix the fixing members 20, it is preferred to provide such a plurality of tooth-shaped recessed portions 201. For example, the tooth-shaped recessed portions 201 are provided, which are formed to match respective shapes of two or more molars of the patient. The fixing members 20 can be stably set on the teeth T by providing the tooth-shaped recessed portions 201 corresponding to respective shapes of the two or more molars.

For example, the tooth-shaped recessed portions 201 include a first tooth-shaped recessed portion 201a that is capped on a right molar T1, a second tooth-shaped recessed portion 201b that is capped on a left molar T2, and a third tooth-shaped recessed portion 201c that is capped on a right premolar T3. This allows the three tooth-shaped recessed portions 201 to increase the sense of stability, and two of the three are capped on the right-side molars (right molar T1 and right premolar T3) thereby to easily ensure a space on the left side (right side viewed from the practitioner) for entering a treatment tool (such as a space for entering the drill device 100).

The tooth-shaped recessed portions 201 may be provided so as to be capped on other teeth than these teeth.

The connecting portions 30 are members that connect the guide frame unit 10 and the fixing members 20 and determine the position of the guide frame unit 10 in the oral cavity with reference to the teeth T. The connecting portions 30 are provided in a rod shape so as to connect between the tooth-shaped recessed portions 201 of the fixing members 20 and the guide frame unit 10. The connecting portions 30 may include those directly connecting adjacent tooth-shaped recessed portions 201. The positional relationships between the guide frame unit 10 and the fixing members 20 are determined by the connecting portions 30, and the positions of the plurality of guide frames 101 in the oral cavity are determined by capping the tooth-shaped recessed portions 201 on the corresponding teeth T.

In the guide device 1 according to the present embodiment, each guide frame 101 is provided with a non-annular protruding portion 102 that sets the insertion depth of a member to be inserted into a hole 101h inside the guide frame 101. The protruding portion 102 is provided so as to project to the upper side of the guide frame 101 (the side opposite to the side to be in contact with the hard palate HP).

A guide sleeve 2 or a screw 5 is inserted into the hole 101h of the guide frame 101. As for the guide sleeve 2, for example, the outer diameter of the guide sleeve 2 is almost equal to (slightly smaller than) the inner diameter of the hole 101h of the guide frame 101. The height of the guide frame 101 is lower than the length of the guide sleeve 2, and when the guide sleeve 2 is inserted in the hole 101h of the guide frame 101, the upper end of the guide sleeve 2 is positioned at a position higher than the height of the guide frame 101. The guide sleeve 2 serves as a guide when inserting a drill 110 of the drill device 100. The configuration of the guide sleeve 2 will be described later.

Each guide frame 101 is provided with the non-annular protruding portion 102; therefore, when a member such as the guide sleeve 2 is inserted into the hole 101h of the guide frame 101, the guide sleeve 2 or the like can be inserted to an appropriate depth without interfering with other guide frames 101 or other protruding portions 102.

(Configuration of Guide Sleeve)

Figure 2A:
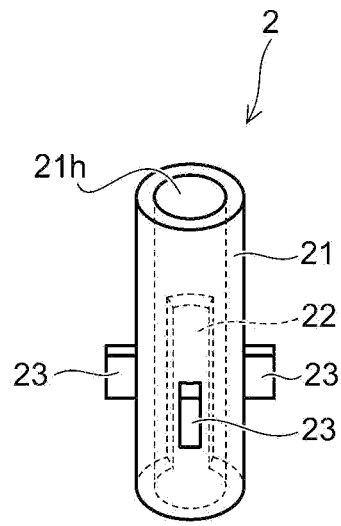
FIGS. 2(a) and 2(b) are perspective diagrams exemplifying the configuration of a guide sleeve.
Figure 2B:
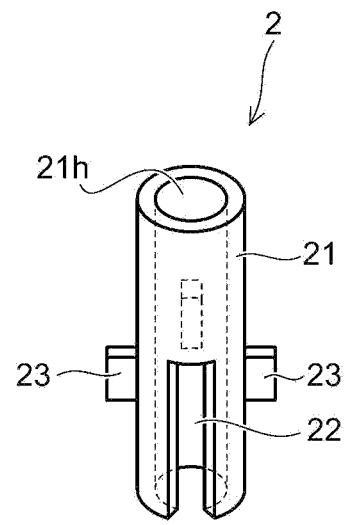

FIGS. 2(a) and 2(b) are perspective diagrams illustrating the configuration of a guide sleeve. FIGS. 2(a) and 2(b) are perspective diagrams of the guide sleeve 2 viewed from different directions.

The guide sleeve 2 includes a tubular sleeve main body 21 to be inserted into the hole 101h of the guide frame 101, a water injection slit 22 provided in a direction in which the sleeve main body 21 extends, and projecting portions 23 provided on the outer peripheral surface of the sleeve main body 21.

The length of the sleeve main body 21 is longer than the height of the guide frame 101, and when the sleeve main body 21 is inserted in the hole 101h of the guide frame 101, the sleeve main body 21 comes to a state of protruding to a position higher than the guide frame 101. The drill 110 of the drill device 100 is inserted into the hole 21h of the sleeve main body 21. The drill 110 is inserted in the direction of the hole 21h of the sleeve main body 21 and supported by the sleeve main body 21 as a guide. When the sleeve main body 21 is inserted into the hole 101h of the guide frame 101 in a state in which the drill 110 is inserted in the sleeve main body 21, the drill 110 is guided by the sleeve main body 21 which is inserted in the guide frame 101.

The water injection slit 22 is a slit for pouring cooling water onto the drill 110 inserted in the hole 21h of the sleeve main body 21 when making the hole h in the hard palate HP with the drill 110. The water injection slit 22 is provided to be located from a position above the guide frame 101 to the lower end when the sleeve main body 21 is inserted in the hole 101h of the guide frame 101, and water can be poured onto the drill 110 without being obstructed by the guide frame 101.

Each projecting portion 23 is provided on the middle of the outer peripheral surface of the sleeve main body 21 so as to project radially outward from the outer peripheral surface. When the sleeve main body 21 is inserted into the hole 101h of the guide frame 101, the sleeve main body 21 is inserted to a position at which the protruding portion 102 of the guide frame 101 and the projecting portion 23 come into contact with each other. That is, the projecting portion 23 serves to determine the depth of insertion of the sleeve main body 21 into the hole 101h of the guide frame 101 in accordance with the positional relationship with the projecting portion 23.

Figure 3:
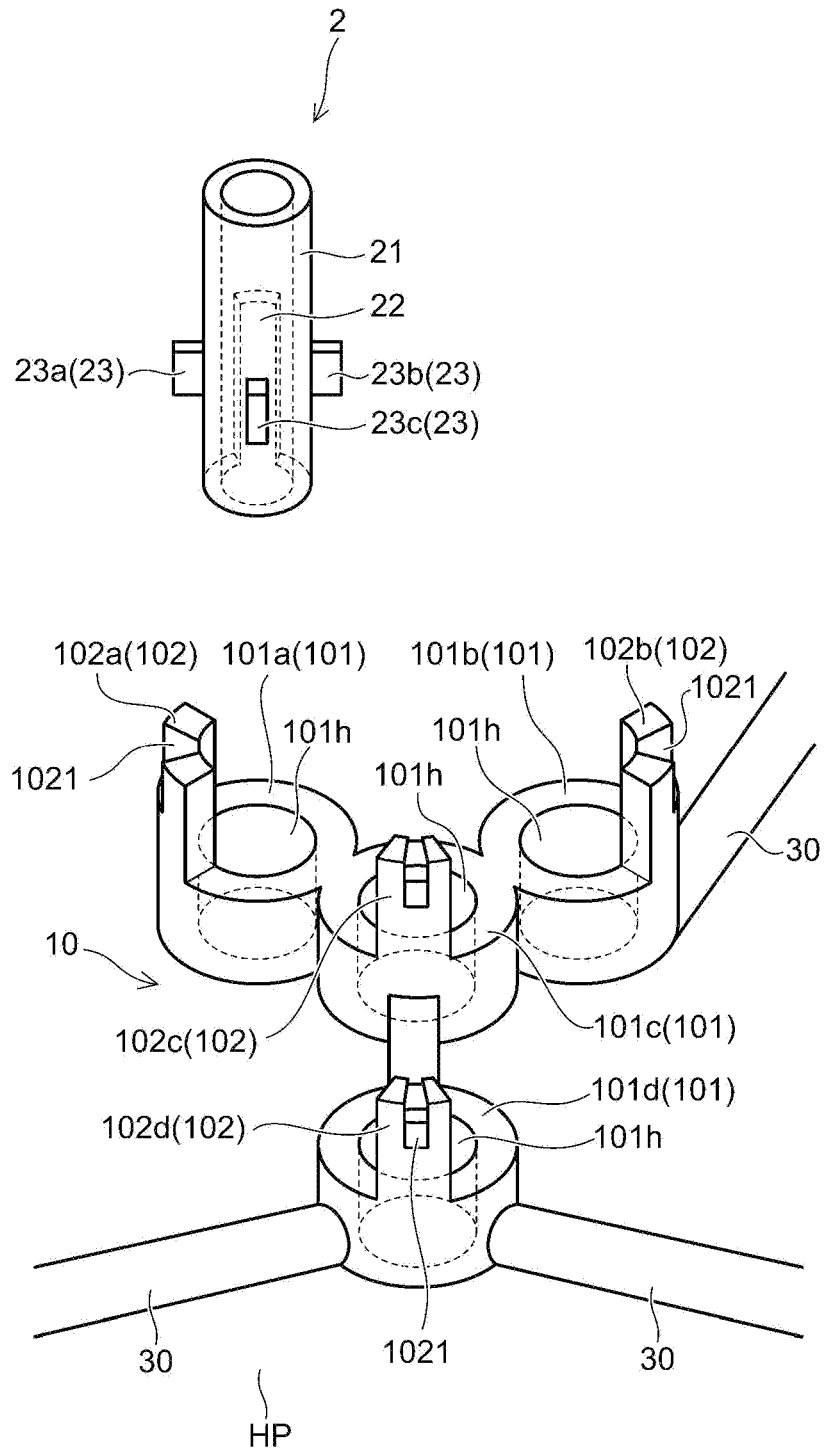
FIG. 3 is a perspective diagram illustrating the relationship between the guide sleeve and guide frames.

FIG. 3 is a perspective diagram illustrating the relationship between the guide sleeve and guide frames.

A plurality of the projecting portions 23 are provided on the outer peripheral surface of the sleeve main body 21 of the guide sleeve 2 at predetermined intervals in the circumferential direction. For example, except for the position of the water injection slit 22, three projecting portions 23 are provided at intervals of 90 degrees when viewed from above.

On the other hand, the protruding portion 102 of each guide frame 101 is provided with a recessed portion 1021 from the upper end to the middle on the lower side. When the sleeve main body 21 is inserted in the hole 101h of the guide frame 101, the projecting portion 23 is fitted in the recessed portion 1021, and the insertion depth of the sleeve main body 21 is determined at a position at which the projecting portion 23 reaches the bottom of the recessed portion 1021.

That is, the insertion depth when the guide sleeve 2 is inserted in the hole 101h of the guide frame 101 is determined from the relationship between the height of the bottom in the recessed portion 1021 of the protruding portion 102 of the guide frame 101 (the height from the lower surface of the guide frame 101) and the height of the lower surface in the projecting portion 23 of the guide sleeve 2.

When the guide sleeve 2 is being inserted into the hole 101h of the guide frame 101, the projecting portion 23 can be fitted into the recessed portion 1021 thereby to restrict the rotation of the guide sleeve 2. The guide sleeve 2 is therefore inserted into the hole 101h of the guide frame 101 without being affected by the rotation of the drill 110.

Here, in an preferred embodiment, the non-annular protruding portion 102 provided on each guide frame 101 lies within a range of 180 degrees or less, preferably 90 degrees or less, of the circumference of the upper end of the guide frame 101 when viewed from above. In addition, adjacent guide frames 101 are arranged so that the protruding portions 102 are not positioned closest to each other. Furthermore, in all the guide frames 101, each protruding portion 102 is preferably provided at a position that allows the protruding portion 102 to be fitted with any of the projecting portions 23 without rotating the guide sleeve 2.

It is assumed, for example, that when the guide frame unit 10 is viewed from above, the guide frame 101 provided at the leftmost position is a first guide frame 101a, the guide frame 101 provided at the rightmost position is a second guide frame 101b, the guide frame 101 placed on the near side of the center is a third guide frame 101c, and the guide frame 101 placed on the far side of the center is a fourth guide frame 101d.

It is also assumed that the protruding portion 102 provided on the first guide frame 101a is a first protruding portion 102a, the protruding portion 102 provided on the second guide frame 101b is a second protruding portion 102b, the protruding portion 102 provided on the third guide frame 101c is a third protruding portion 102a, and the protruding portion 102 provided on the fourth protruding portion 102c is a fourth protruding portion 102d.

It is further assumed that when the guide sleeve 2 is viewed from above, the projecting portion 23 provided on the left side in a state in which the water injection slit 22 is positioned on the near side is a first projecting portion 23a, the projecting portion 23 provided on the right side is a second projecting portion 23b, and the projecting portion 23 provided on the opposite side to the water injection slit 22 is a third projecting portion 23c.

Each of the first protruding portion 102a to the fourth protruding portion 102d is provided within a range of about 90 degrees when viewed from above, the first protruding portion 102a is arranged on the left side of the first guide frame 101a, the second protruding portion 102b is arranged on the right side of the second guide frame 101b, the third protruding portion 102c is arranged on the far side of the third guide frame 101c, and the fourth protruding portion 102d is arranged on the far side of the fourth guide frame 101d.

Thus, even when the guide sleeve 2 is inserted in any guide frame 101 of the first guide frame 101a to the fourth guide frame 101d without rotating the guide sleeve 2 in a state in which the water injection slit 22 is located on the near side, any of the first projecting portion 23a to the third projecting portion 23c is fitted into the recessed portion 1021 of the protruding portion 102 of the guide frame 101 in which the guide sleeve 2 is inserted.

For example, when the guide sleeve 2 is inserted into the hole 101h of the first guide frame 101a with the water injection slit 22 facing the near side, the first projecting portion 23a provided on the left side of the sleeve main body 21 is fitted into the recessed portion 1021 of the first protruding portion 102a which is provided on the left side of the first guide frame 101a.

Likewise, when the guide sleeve 2 is inserted into the hole 101h of the second guide frame 101b with the water injection slit 22 facing the near side, the second projecting portion 23b provided on the right side of the sleeve main body 21 is fitted into the recessed portion 1021 of the second protruding portion 102b which is provided on the right side of the second guide frame 101b.

Likewise, when the guide sleeve 2 is inserted into the hole 101h of the third guide frame 101c with the water injection slit 22 facing the near side, the third projecting portion 23c provided on the far side of the sleeve main body 21 is fitted into the recessed portion 1021 of the third protruding portion 102c which is provided on the far side of the third guide frame 101c.

Likewise, when the guide sleeve 2 is inserted into the hole 101h of the fourth guide frame 101d with the water injection slit 22 facing the near side, the third projecting portion 23c provided on the far side of the sleeve main body 21 is fitted into the recessed portion 1021 of the fourth protruding portion 102d which is provided on the far side of the fourth guide frame 101d.

Thus, upon sequential insertion of the guide sleeve 2 into the plurality of guide frames 101, even when the guide sleeve 2 is inserted into the hole 101h of any of the guide frames 101, one of the projecting portions 23 is fitted into the recessed portion 1021 of the protruding portion 102 of the guide frame 101 without rotating the guide sleeve 2. This allows the water injection slit 22 to be always positioned at the same position (e.g., the near side of the oral cavity), and water can be injected from a fixed position when making a hole with the drill 110.

Moreover, by forming the non-annular protruding portions 102 as in the present embodiment, even if the plurality of guide frames 101 are arranged in a state of being close to each other, when the guide sleeve 2 or the like is inserted into the hole 101h of one guide frame 101, the insertion is possible without interfering with the protruding portions 102 of other guide frames 101. In particular, the protruding portions 102 of adjacent guide frames 101 are not arranged closest to each other; therefore, a sufficient space can be ensured on the opposite side to the protruding portion 102 of interest when viewed from above, and the treatment can be performed without interfering with other protruding portions 102 upon insertion of the guide sleeve 2.

Furthermore, when inserting the guide sleeve 2, the projecting portion 23 of the guide sleeve 2 is fitted into the recessed portion 1021 of the protruding portion 102, and the insertion depth of the guide sleeve 2 can thereby be stably set.

(Example of Use of Guide Device)

The description will then be directed to an example of the hole making and screw installation using the guide device 1 according to the present embodiment.

FIGS. 4 to 8 are schematic diagrams for explaining an example of hole making using the guide device according to the present embodiment.

First, the guide device 1 is formed to match the patient by preliminarily determining the position, length, etc. of the connecting portions 30 so that the guide frame unit 10 is arranged at a certain position on the hard palate HP of the patient for the recessed shapes of the tooth-shaped recessed portions 201 and the fixing members 20 to match the shapes of the teeth T of the patient.

Figure 4:
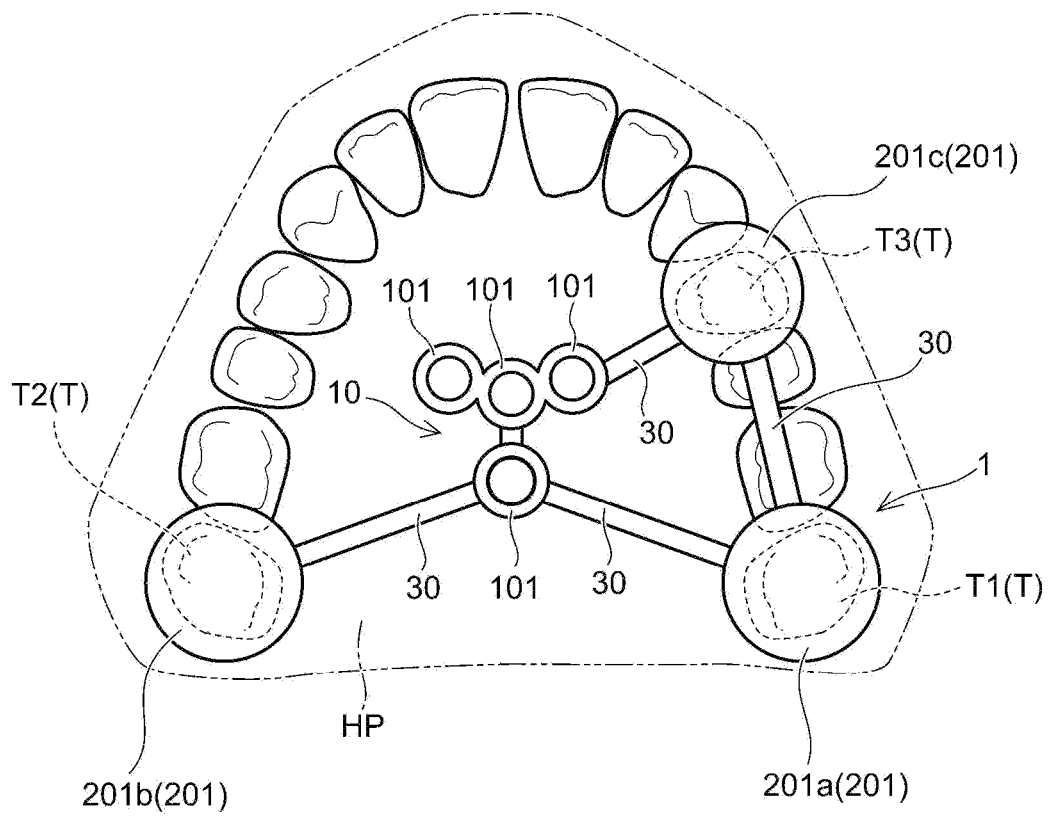
FIG. 4 is a schematic diagram for explaining an example of hole making using the guide device according to the present embodiment.

After forming the guide device 1, as illustrated in FIG. 4, the guide device 1 is set in the oral cavity of the patient. That is, the tooth-shaped recessed portions 201 of the fixing members 20 of the guide device 1 are capped on the corresponding teeth T of the patient. This allows the position of the guide frame unit 10 of the guide device 1 to be set at the certain position on the hard palate HP of the patient, which is preliminarily set. When the guide frame unit 10 is set at the certain position on the hard palate HP, the positions of the guide frames 101 are arranged on respective positions at which the holes h are to be drilled. The position of each guide frame 101 is also preliminarily set at a position suitable for hole making to match the state of the oral cavity of the patient (state of the hard palate HP and the maxillary bone).

When setting the guide device 1, the first tooth-shaped recessed portion 201a may be formed corresponding to the right molar T1, the second tooth-shaped recessed portion 201b may be formed corresponding to the left molar T2, and the third tooth-shaped recessed portion 201c may be formed corresponding to the right premolar T3. This is because the three tooth-shaped recessed portions 201 enhance the sense of stability and the space for treatment can be easily ensured on the left side (right side viewed from the practitioner) by capping two of the three on the right-side molars (right molar T1 and right premolar T3).

Figure 5:
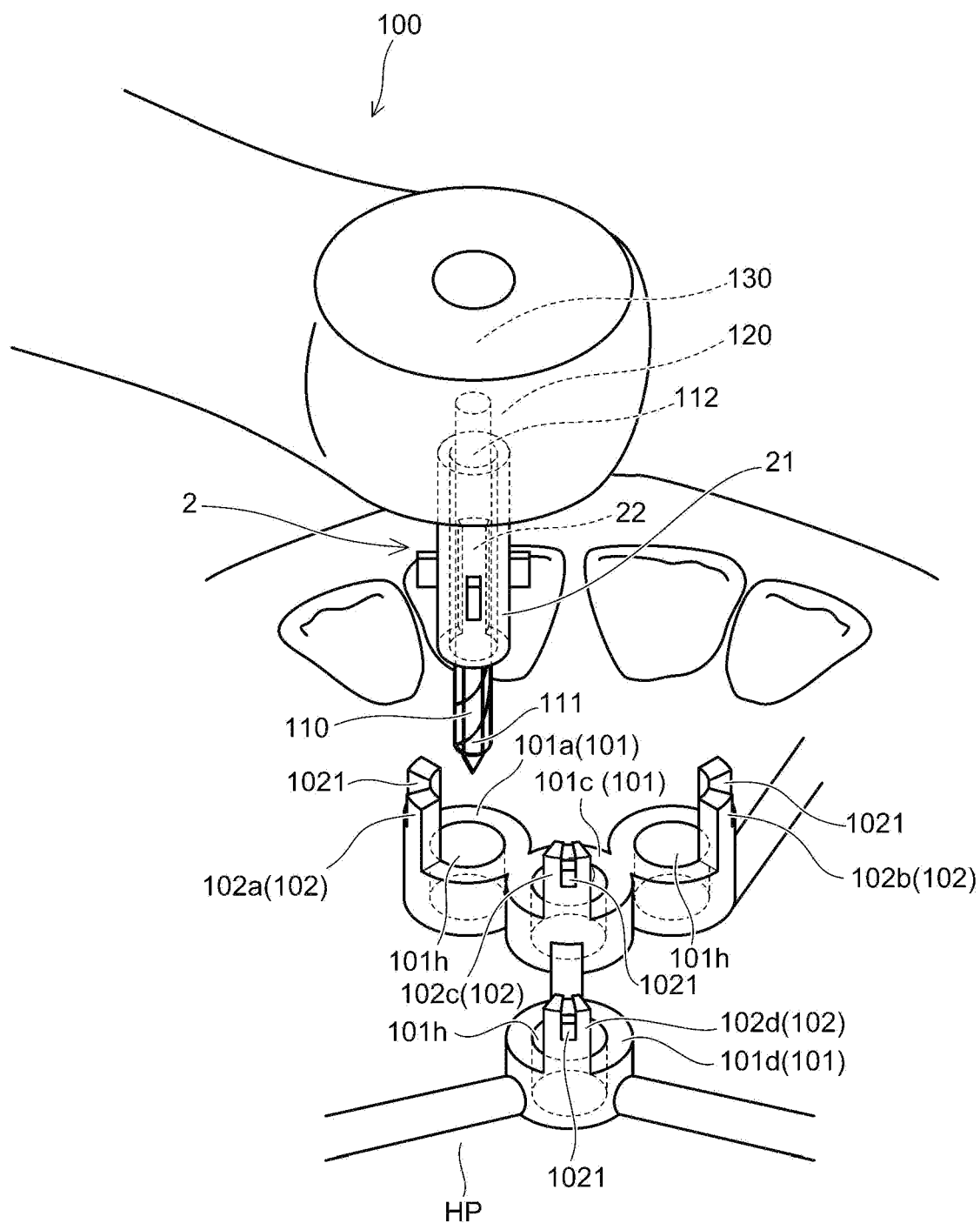
FIG. 5 is a schematic diagram for explaining an example of hole making using the guide device according to the present embodiment.

Then, as illustrated in FIG. 5, the drill 110 of the drill device 100 is inserted into the guide sleeve 2, and the guide sleeve 2 is positioned above the guide frame 101. Thus, the drill device 100 includes: the drill 110 that is composed of a drill blade 111 extending in a hole making direction and a shaft body 112 connected to the drill blade 111; a holding mechanism 120 that holds the shaft body 112 of the drill 110; a rotating operation unit 130 having a rotating mechanism that rotates the drill 110 together with the holding mechanism 120; and the guide sleeve 2 in a state in which the drill 110 is inserted in the sleeve main body 21.

When inserting the guide sleeve 2 into the drill 110, the water injection slit 22 of the guide sleeve 2 may be on the near side. When the water injection slit 22 is on the near side, it is easy to perform the water injection process and to perceive the water injection state. Then, the drill 110 is positioned, for example, above the leftmost first guide frame 101a.

Figure 6:
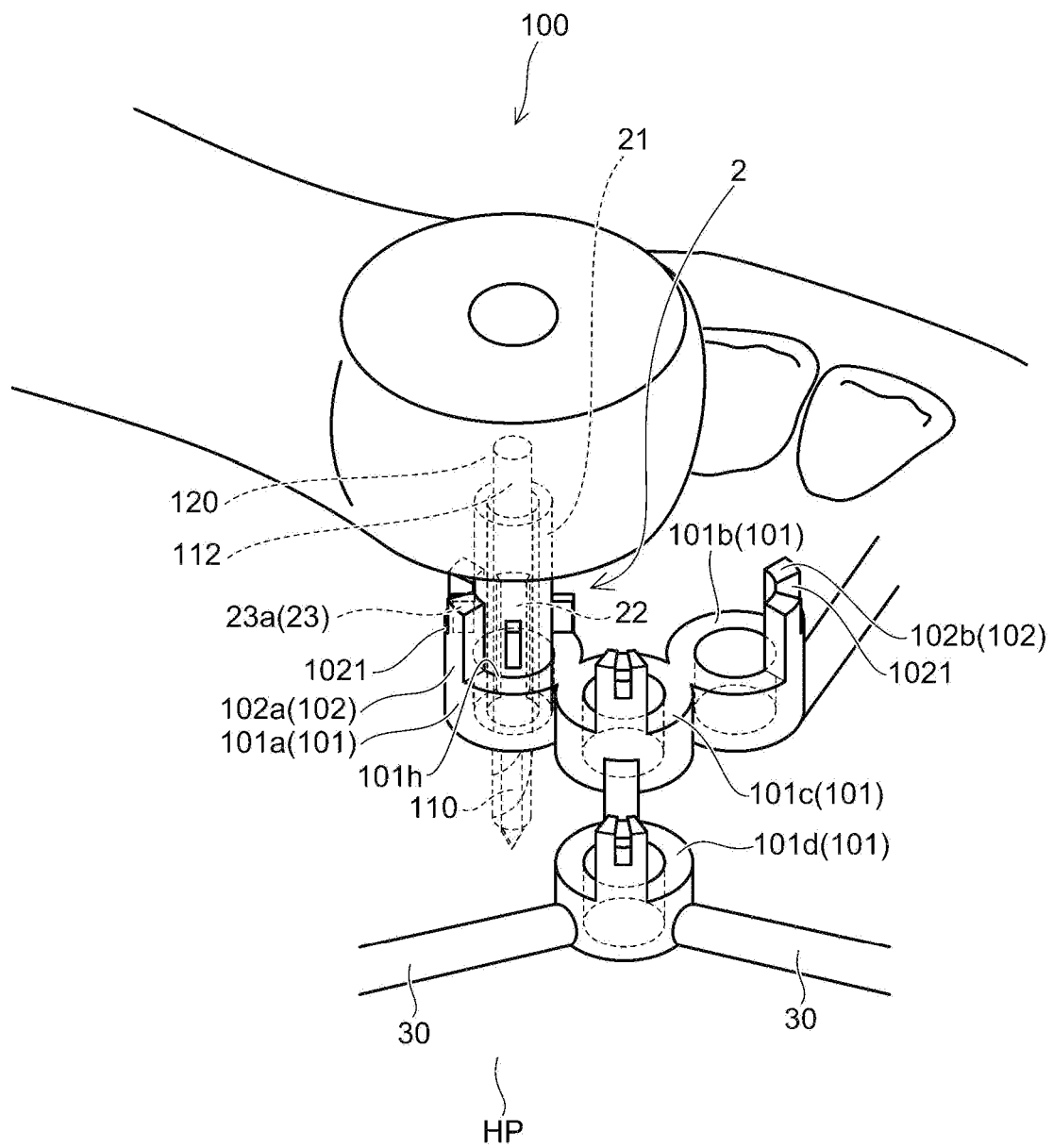
FIG. 6 is a schematic diagram for explaining an example of hole making using the guide device according to the present embodiment.

Next, as illustrated in FIG. 6, the drill 110 inserted in the guide sleeve 2 is inserted into the hole 101h of the first guide frame 101a together with the guide sleeve 2, and a hole is drilled from the hard palate HP to the maxillary bone using the drill 110 while injecting water from the water injection slit 22.

The drill 110 is guided by the guide sleeve 2 inserted in the first guide frame 101a and enters straight. As the guide sleeve 2 is inserted into the hole 101h of the first guide frame 101a, the first projecting portion 23a on the left side of the guide sleeve 2 fits into the recessed portion 1021 of the first protruding portion 102a of the first guide frame 101a, and the guide sleeve 2 does not enter anymore at a position at which the first projecting portion 23a reaches the bottom of the recessed portion 1021. This allows the guide sleeve 2 to be stably held in the first guide frame 101a, and the drill 110 is also supported straight by the guide sleeve 2. Then, the drill 110 drills to a predetermined depth. The drill 110 may be advanced to a depth at which the holding mechanism 120 holding the shaft body 112 of the drill 110 comes into contact with the upper end of the sleeve main body 21. This can prevent the hole h from being drilled deeper than necessary.

Here, when the drill 110 is guided by the guide frame 101, the larger the thickness (height) of the guide frame 101, the more stable the guiding of the drill 110. As the thickness of the guide frame 101 increases, however, the space above the guide frame 101 becomes narrower in the oral cavity to deteriorate the workability when inserting the drill 110 into the guide frame 101. For this reason, in the present embodiment, the thickness (height) of the guide frame 101 is reduced, and the drill 110 is inserted into the guide frame 101 together with the guide sleeve 2 in a state in which the drill 110 is inserted in the guide sleeve 2. This can ensure a sufficient space above the guide frame 101, and by inserting the guide sleeve 2 in the guide frame 101, the height when guiding the drill 110 can be raised to the height of the guide sleeve 2.

Moreover, the insertion depth of the guide sleeve 2 into the guide frame 101 is determined by the position at which the projecting portion 23 comes into contact with the bottom of the recessed portion 1021 of the protruding portion 102, and it is therefore possible to set a limit on the depth when the hole h is drilled with the drill 110. Since the protruding portion 102 which serves as a guide for the depth of the drill 110 is provided in a non-annular shape, the treatment can be performed so that the drill device 100 does not interfere with the protruding portions 102 of other guide frames.

Figure 7:
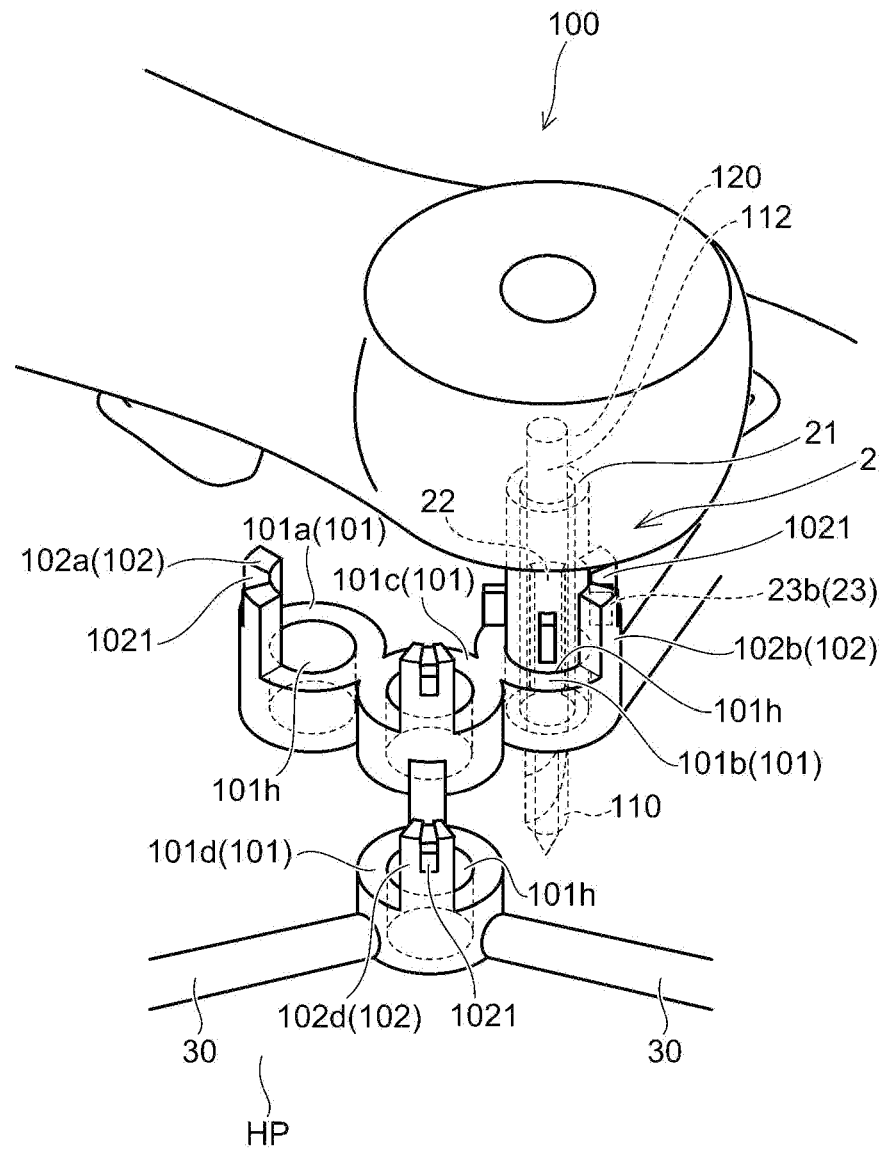
FIG. 7 is a schematic diagram for explaining an example of hole making using the guide device according to the present embodiment.

Next, as illustrated in FIG. 7, the drill 110 inserted in the guide sleeve 2 is inserted into the hole 101h of another guide frame 101 (e.g., the rightmost second guide frame 101b) together with the guide sleeve 2, and a hole is drilled from the hard palate HP to the maxillary bone using the drill 110 while injecting water from the water injection slit 22.

The drill 110 is guided by the guide sleeve 2 inserted in the second guide frame 101b and enters straight. When the guide sleeve 2 is inserted into the hole 101h of the second guide frame 101b in the same direction as that when the hole h is drilled using the first guide frame 101a, the second projecting portion 23b on the right side of the guide sleeve 2 fits into the recessed portion 1021 of the second protruding portion 102b of the second guide frame 101b, and the guide sleeve 2 does not enter anymore at a position at which the second projecting portion 23b reaches the bottom of the recessed portion 1021. This allows the guide sleeve 2 to be stably held in the second guide frame 101b, and the drill 110 is also supported straight by the guide sleeve 2. Then, the drill 110 drills to a predetermined depth. As before, the drill 110 may be advanced to a depth at which the holding mechanism 120 holding the shaft body 112 of the drill 110 comes into contact with the upper end of the sleeve main body 21. This can prevent the hole h from being drilled deeper than necessary.

Here, even when the guide sleeve 2 is inserted into the second guide frame 101b without changing the direction of the guide sleeve 2 from that at the time of the previous hole making, the second projecting portion 23b on the right side of the guide sleeve 2 is fitted into the recessed portion 1021 of the second protruding portion 102b which is provided on the right side in the second guide frame 101b, and the insertion depth of the guide sleeve 2 into the second guide frame 101b can be restricted.

In addition, the above operation is performed without rotating the guide sleeve 2; therefore, the water injection slit 22 is always oriented in the same direction (near side), and the water injection is easy.

Figure 8:
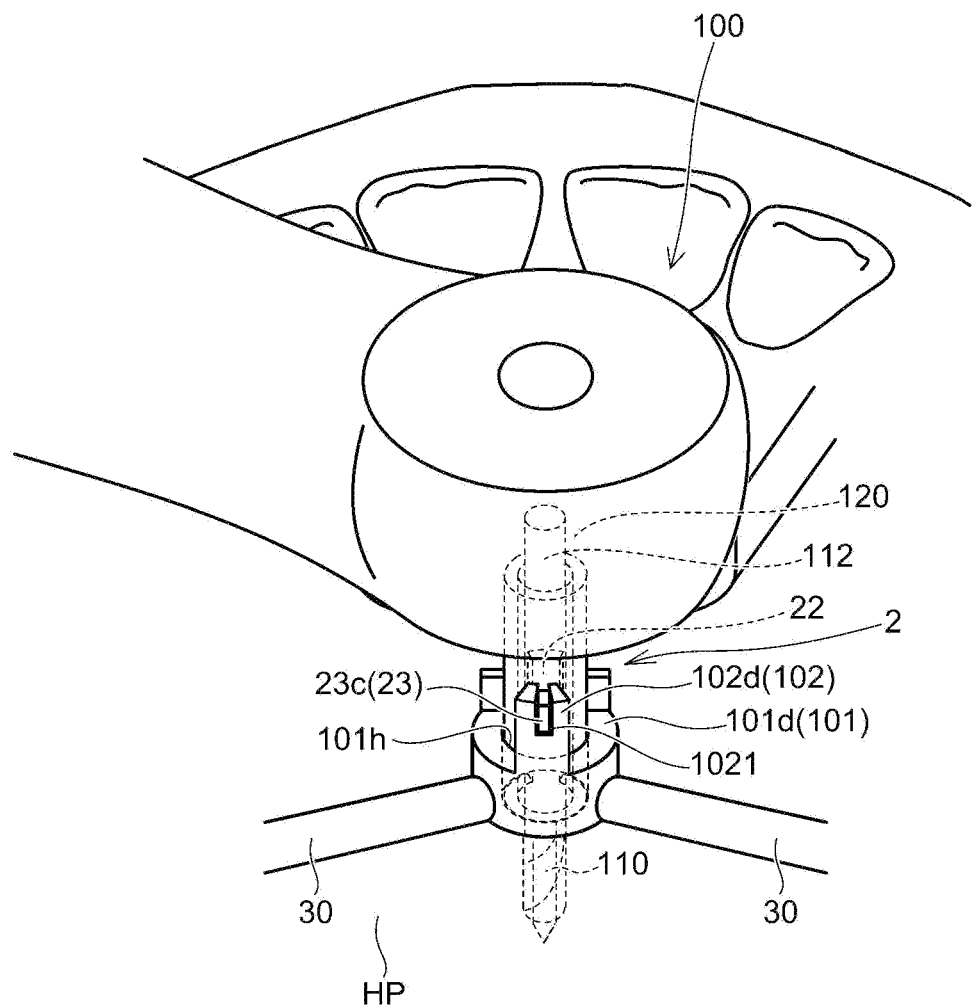
FIG. 8 is a schematic diagram for explaining an example of hole making using the guide device according to the present embodiment.

The same applies to the hole making using the third guide frame 101c and the fourth guide frame 101d. For example, as illustrated in FIG. 8, the drill 110 inserted in the guide sleeve 2 is inserted into the hole 101h of the fourth guide frame 101d on the farthest side together with the guide sleeve 2, and a hole is drilled from the hard palate HP to the maxillary bone using the drill 110.

The guide sleeve 2 is inserted into the fourth guide frame 101d in the same direction as that when the hole is drilled using the other guide frame 101. Through this operation, the third projecting portion 23c of the guide sleeve 2 on the opposite side to the water injection slit 22 fits into the recessed portion 1021 of the fourth protruding portion 102d of the fourth guide frame 101d, and the guide sleeve 2 does not enter anymore at a position at which the third projecting portion 23c reaches the bottom of the recessed portion 1021. This allows the guide sleeve 2 to be stably held in the fourth guide frame 101d, and the drill 110 is also supported straight by the guide sleeve 2. Then, the drill 110 drills to a predetermined depth. As before, the drill 110 may be advanced to a depth at which the holding mechanism 120 holding the shaft body 112 of the drill 110 comes into contact with the upper end of the sleeve main body 21. This can prevent the hole h from being drilled deeper than necessary.

Here, even when the guide sleeve 2 is inserted into the fourth guide frame 101d without changing the direction of the guide sleeve 2 from that at the time of the previous hole making, the third projecting portion 23c on the far side of the guide sleeve 2 is fitted into the recessed portion 1021 of the fourth protruding portion 102d which is provided on the far side in the fourth guide frame 101d, and the insertion depth of the guide sleeve 2 into the fourth guide frame 101d can be restricted.

In addition, the above operation is performed without rotating the guide sleeve 2; therefore, the water injection slit 22 is always oriented in the same direction (near side), and the water injection is easy.

(Screw Retainer)

The description will then be directed to a screw retainer used when screwing the screw 5 into the hole h drilled by the drill 110.

Figure 9:
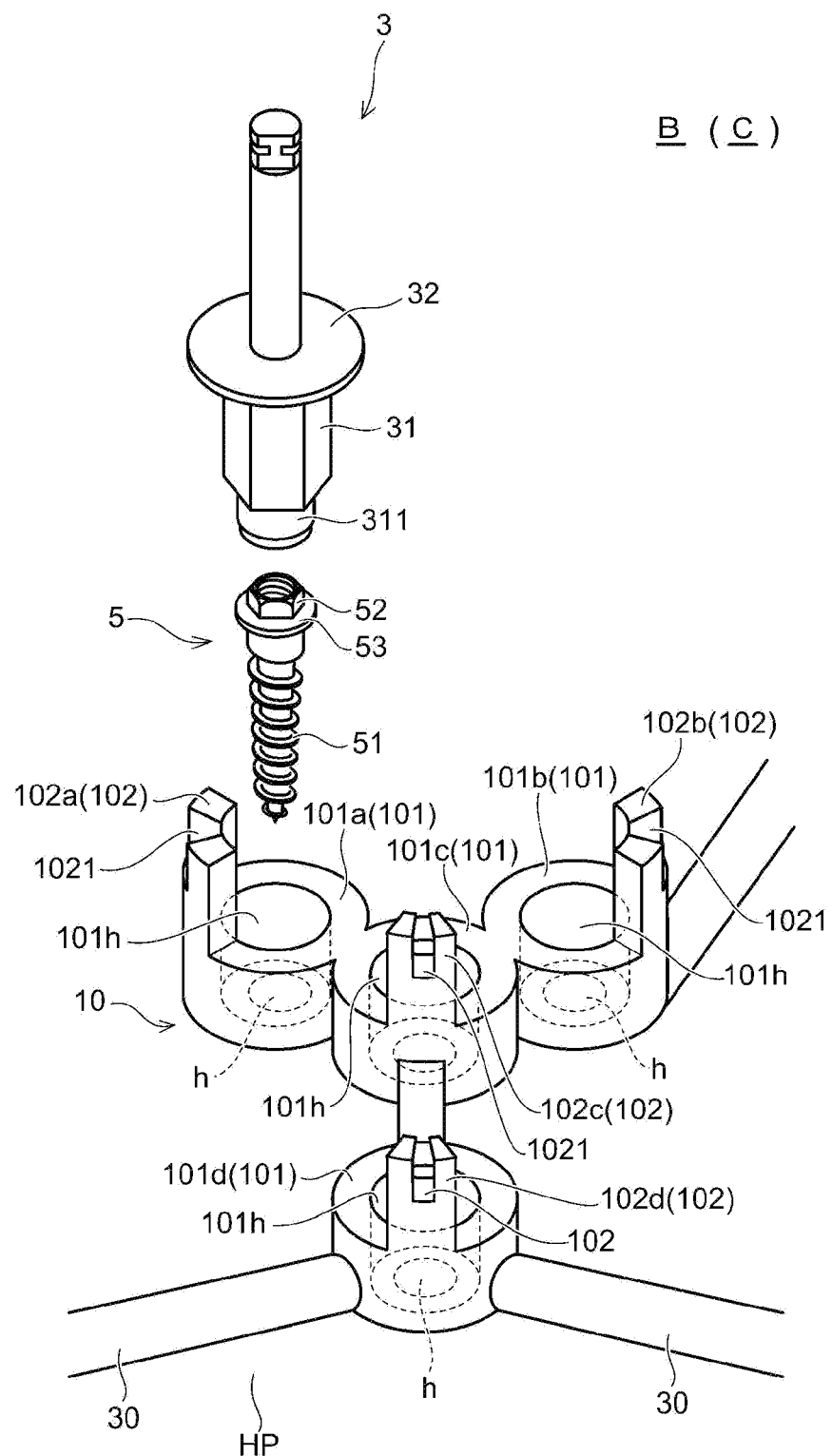
FIG. 9 is a perspective diagram exemplifying a screw retainer according to the present embodiment.

FIG. 9 is a perspective diagram illustrating the screw retainer according to the present embodiment.

Screw retainer 3 is a member that retains the screw 5 when screwing the screw 5 into the hole using the guide frame 101 of the guide device 1.

The screw retainer 3 includes: a retainer main body 31 that has a fitting portion 311 on the tip end side for fitting the screw 5 and is inserted into the hole 101h of the guide frame 101 in a state in which the screw 5 is fitted in the fitting portion 311; and a flange portion 32 that is provided from a position midway in the length direction of the retainer main body 31 so as to be able to come into contact with the protruding portion 102.

The screw 5 has a threaded portion 51 to be implanted in the hole h of the maxillary bone drilled by the drill 110, and a polygonal column head portion 52 exposed in the oral cavity. The threaded portion 51 has a screw shape so that it can be screwed into the hole h of the maxillary bone. The threaded portion 51 is preferably a multi-threaded screw such as a double-threaded screw or a triple-threaded screw, and more preferably a triple-threaded screw from the viewpoint of rolling prevention due to three-point support. For the material of the screw 5, for example, titanium-based materials such as pure titanium and titanium alloys, stainless alloys, etc. may be used as materials having excellent biocompatibility.

The outer shape of the polygonal column head portion 52 is a regular polygonal column (e.g., hexagonal column). The center of the polygonal column head portion 52 is formed with an inner thread so that a bolt 7 (see FIG. 12), which will be described later, can be tightened. A flange portion 53 is provided between the threaded portion 51 and the polygonal column head portion 52. When the screw 5 is implanted in the maxillary bone, the screw 5 is embedded to a position at which the lower surface of the flange portion 53 comes into contact with the surface of the hard palate HP.

When implanting the screw 5 in the hole, it needs to be implanted straight in the hole. In the present embodiment, the polygonal column head portion 52 of the screw 5 is fitted into a fitting portion 311 of the screw retainer 3, and the screw 5 is fixed on the extension of the retainer main body 31. In this state, the screw 5 is inserted into the hole 101h of the guide frame 101, and the retainer main body 31 is axially rotated. This allows the screw retainer 3 to rotate while being guided by the guide frame 101, and the screw 5 can be implanted straight in the hole h.

FIGS. 10(a) to 11(c) are schematic cross-sectional diagrams illustrating a method of implanting the screw using the screw retainer.

Figure 10A:
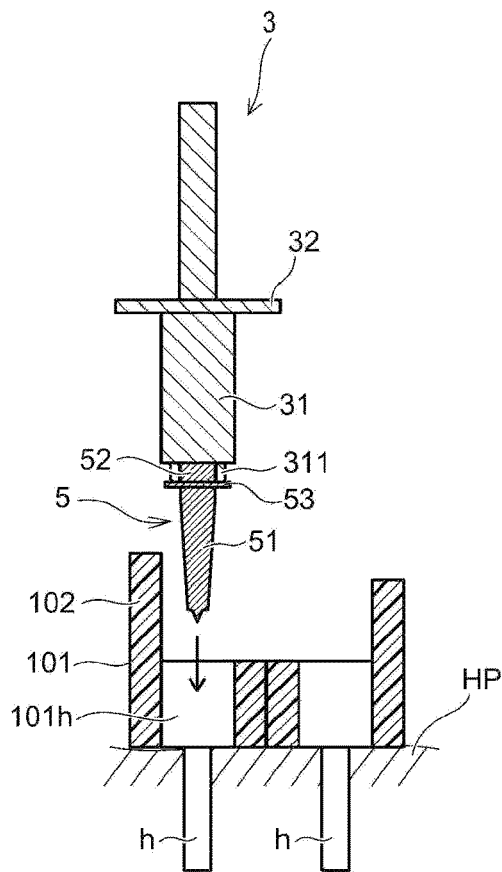
FIGS. 10(a) and 10(b) are schematic cross-sectional diagrams exemplifying a method of implanting a screw using the screw retainer.

First, after drilling the holes h from the hard palate HP to the maxillary bone using the previously described guide device 1, the guide device 1 is left as it is in the oral cavity. In this state, as illustrated in FIG. 10(a), the polygonal column head portion 52 of the screw 5 is fitted into the fitting portion 311 of the screw retainer 3 and positioned above the hole 101h of the guide frame 101. The polygonal column head portion 52 is fitted in the fitting portion 311 to such an extent of fitting that the screw 5 does not come off.

Figure 10B:
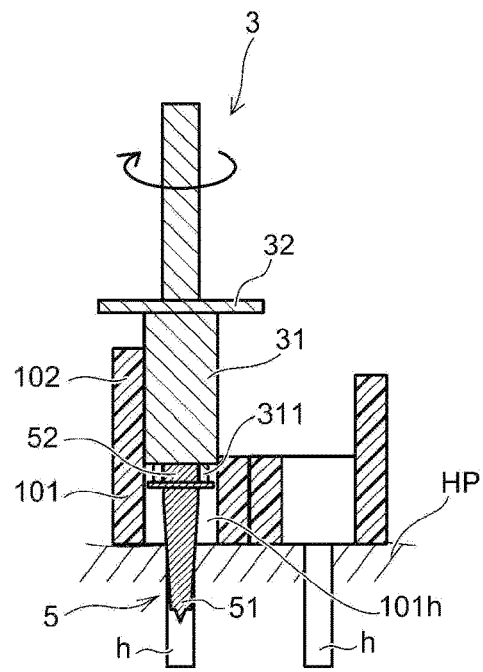

Then, as illustrated in FIG. 10(b), the screw 5 is inserted into the hole 101h of the guide frame 101, and the screw 5 is implanted into the hole h. In this operation, the practitioner axially rotates the retainer main body 31 of the screw retainer 3 using a hand or a treatment tool. This allows the screw 5 to rotate together with the rotation of the retainer main body 31 and the screw 5 is screwed into the hole h. The retainer main body 31 advances while being guided by the guide frame 101, and the implanting direction of the screw 5 can therefore be stabilized.

Figure 11A:
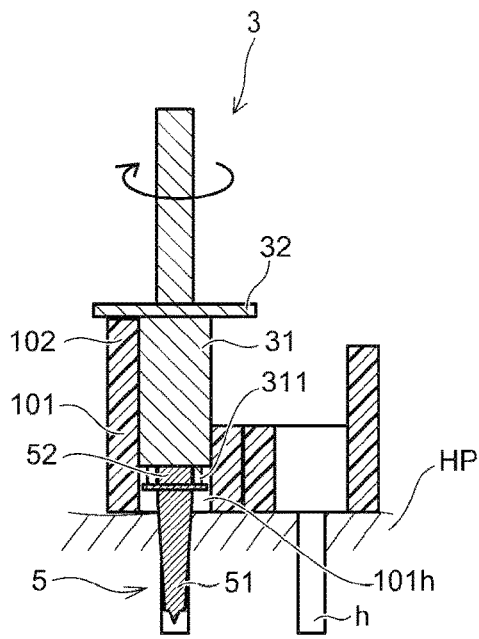
FIGS. 11(a) to 11(c) are schematic cross-sectional diagrams exemplifying a method of implanting the screw using the screw retainer.

As the retainer main body 31 of the screw retainer 3 is further rotated to screw the screw 5, as illustrated in FIG. 11(a), the flange portion 32 of the screw retainer 3 comes into contact with the upper end of the protruding portion 102 of the guide frame 101.

Figures 11B, 11C:
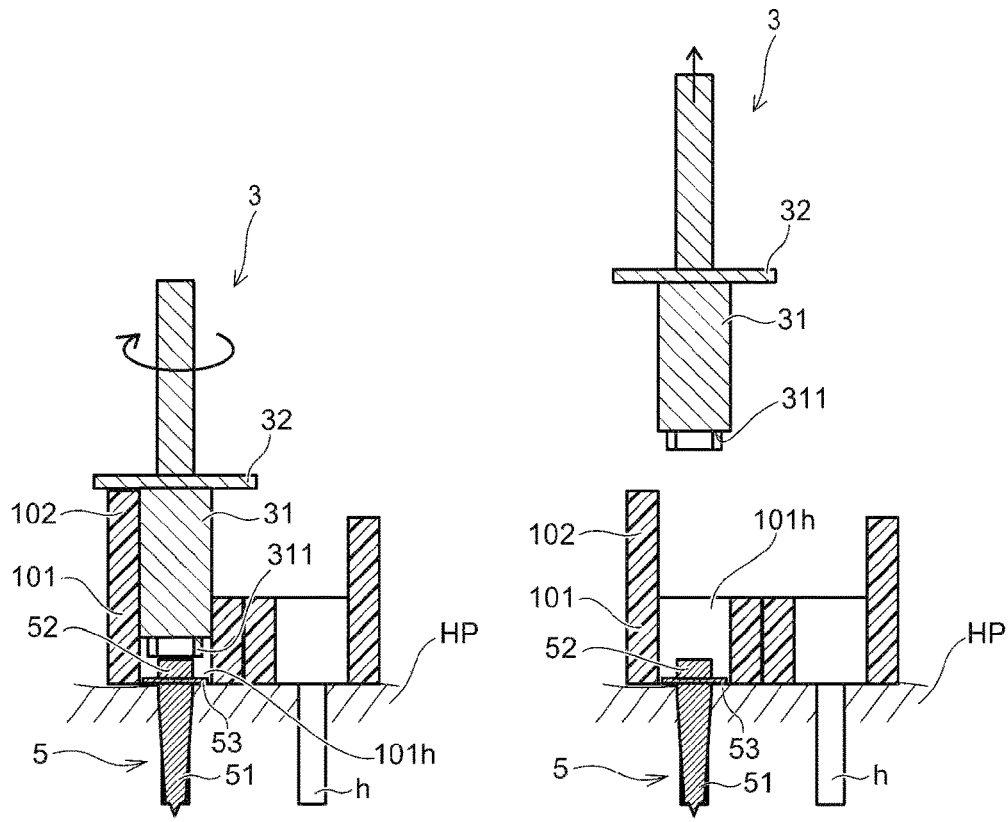

As the retainer main body 31 of the screw retainer 3 is further rotated from this state, as illustrated in FIG. 11(b), the position of the screw retainer 3 remains unchanged, and only the screw 5 is implanted. That is, even though the screw retainer 3 stops advancing, the screw 5 can be rotated until the polygonal column head portion 52 of the screw 5 is released from the fitting portion 311 of the screw retainer 3, and only the screw 5 can be screwed in.

Then, when the polygonal column head portion 52 of the screw 5 is released from the fitting portion 311, the screw 5 cannot be rotated any more, and the screw retainer 3 becomes an idling state. In this state, as illustrated in FIG. 11(c), the screw retainer 3 is extracted from the hole 101h of the guide frame 101. The fitting depth between the fitting portion 311 and the polygonal column head portion 52 of the screw 5 is almost the same as the gap between the flange portion 53 of the screw 5 and the hard palate HP at a position at which the flange portion 32 of the screw retainer 3 comes into contact with the protruding portion 102, so that when the polygonal column head portion 52 of the screw 5 comes out of the fitting portion 311, the screw 5 is implanted to a position at which the flange portion 53 and the hard palate HP just come into contact with each other. Then, when the screw 5 is implanted up to that point, the screw retainer 3 can be extracted from the hole 101h of the guide frame 101 without load.

The same procedure is performed when implanting the screw 5 into another hole h. In the present embodiment, the protruding portion 102 of the guide frame 101 is provided in a non-annular shape; therefore, when the screw and the screw retainer 3 are inserted into the hole 101h of the guide frame 101, treatment can be performed without interfering with other guide frames 101 or other protruding portions 102. In addition, the contact between the screw retainer 3 and the protruding portion 102 restricts the implanting depth of the screw 5, and the screw 5 can be reliably implanted to an appropriate depth.

(Example of Installation of Implant Device)

Figure 12A:
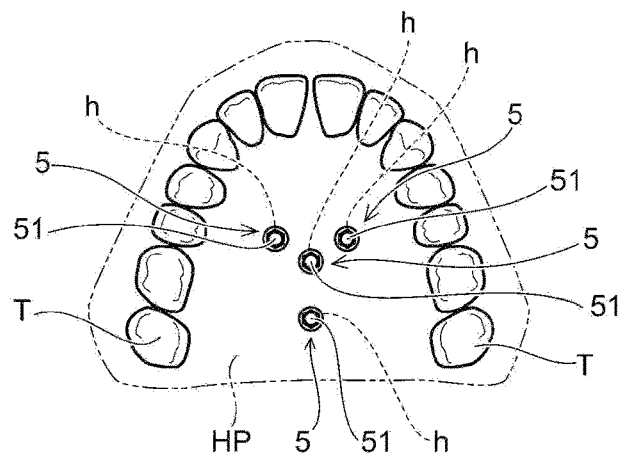
FIGS. 12(a) to 12(c) are schematic diagrams for explaining an example of installing an implant device.
Figure 12B:
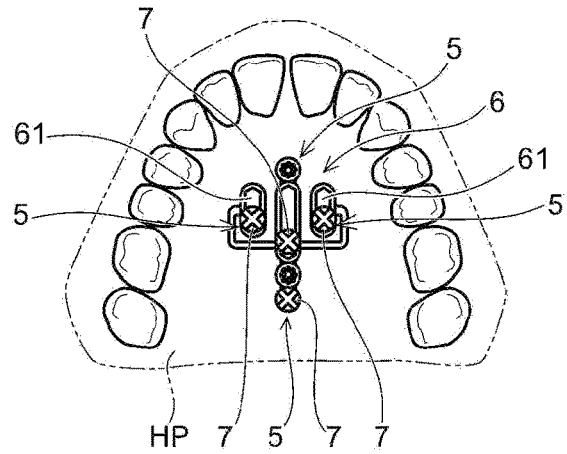
Figure 12C:
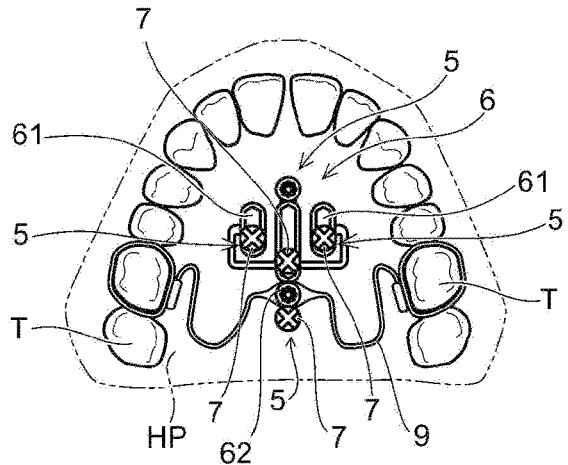

FIGS. 12(a) to 12(c) are schematic diagrams for explaining an example of installing an implant device.

FIG. 12 illustrates an example of installing an implant device to the hard palate HP.

First, as illustrated in FIG. 12(a), four screws 5 are implanted in the hard palate HP. In order to implant the screws 5, the holes h are preliminarily drilled in the hard palate HP using the guide device 1 according to the present embodiment, and the screws 5 are implanted in the holes h using the guide device 1 and the screw retainer 3.

Each screw 5 is implanted until the lower surface of the flange portion 53 comes into contact with the palatine mucosa of the hard palate HP. The polygonal column head portion 52 of the screw 5 comes into a state of being exposed on the hard palate HP. The use of the guide device 1 according to the present embodiment allows the holes h to be drilled at appropriate positions and depth suitable for the patient, and the screws 5 can be implanted at a stable depth.

Then, as illustrated in FIG. 12(b), a base member 6 is attached to the four screws 5 implanted in the hard palate HP. The base member 6 is provided with holes 61 through which the polygonal column head portions 52 of the screws 5 are passed. Some of the holes 61 are long holes so that a slight positional deviation between the positions of the screws 5 and the holes 61 can be absorbed.

After attaching the base member 6 to the four screws 5, bolts 7 are tightened to the polygonal column head portions 52 of the screws 5. This allows the base member 6 to be reliably fixed to the four screws 5.

Then, as illustrated in FIG. 12(c), an auxiliary tool 9 is fixed to a fixing portion 62 of the base member 6. For example, a wire-type auxiliary tool 9 is fastened to bands or brackets attached to the teeth T. The wire-type auxiliary tool 9 may use a highly rigid stainless steel alloy-based wire to fix the relative positions between the teeth T and the base member 6 or may use a highly springy titanium alloy-based wire to apply an optimum force to the teeth T with the base member 6 as a reference (fixing source) in a state in which the wire is appropriately bent to adjust the orthodontic force (tension or pressing force) applied by the auxiliary tool 9.

(Treatment in Oral Cavity)

Examples of treatment for implanting a screw after forming a pilot hole in the oral cavity include installation of an artificial tooth root in an alveolar bone. The artificial tooth root has an equivalent size to that of the tooth root, so its diameter is about 4 mm. In order to implant such a large member, formation of a pilot hole before implanting the artificial tooth root is performed in multiple stages.

Specifically, a thin drill is used first to drill a pilot hole to set the depth, and a thick drill is then used to increase the diameter of the pilot hole, which is formed with the thin drill, to create a space (implantation cavity) in the alveolar bone for inserting the artificial tooth root. Therefore, hole making with the thin drill is required to form the pilot hole to an appropriate depth, but is not required to strictly control the hole making direction.

On the other hand, when increasing the diameter of the pilot hole with a thick drill, the outer diameter of the implantation cavity into which the artificial tooth root is inserted is set in this step, so the rotating shaft of the drill may be aligned with the guide sleeve. In this case, the drill blade grinds the side surface of the hole, and the connecting portion (drill shaft portion) is therefore formed thinner than the drill blade. The guide sleeve into which the connecting portion is inserted has a portion whose outer diameter is larger than that of the drill blade, and is fitted to the guide frame provided on the alveolar bone.

In contrast to such alveolar bone treatment, the present embodiment is suitable for a case of performing treatment on the hard palate HP.

Figure 13:
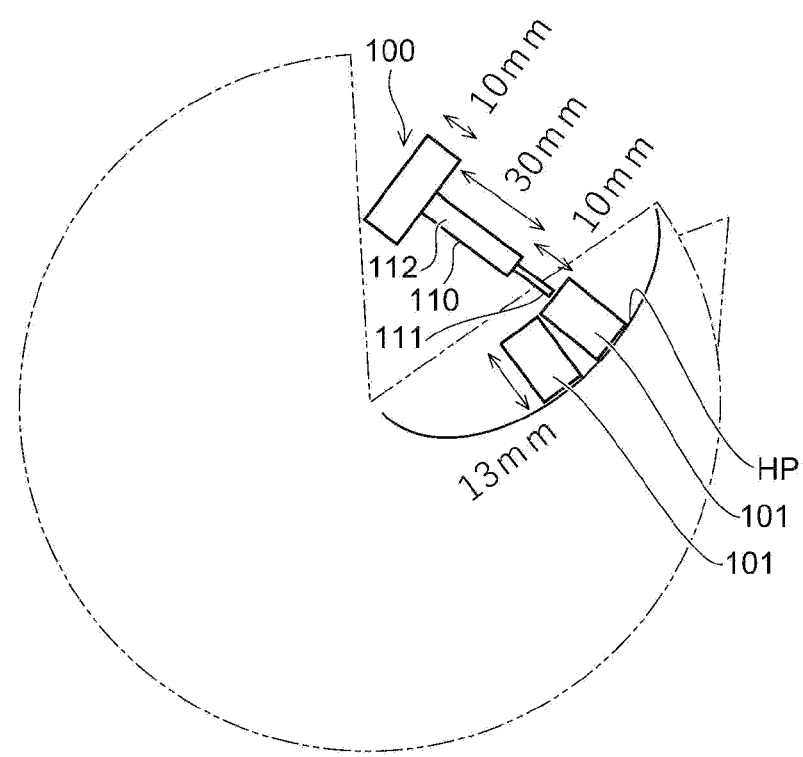
FIG. 13 is a schematic diagram illustrating an example of treatment for a hard palate.

FIG. 13 is a schematic diagram illustrating an example of treatment for the hard palate.

When implanting a screw into the hard palate HP, a screw 5 with a smaller diameter (1 to 2 mm) is implanted, compared to the case of implanting an artificial tooth root. Therefore, a pilot hole (hole h) is completed by one hole making, and the screw 5 is implanted in the pilot hole thus formed. From the viewpoint of minimizing the burden on the patient, it is preferred to complete both the pilot hole formation and the screw implant in one treatment.

In this case, the depth of the pilot hole to be formed can be preliminarily set by measuring the thickness of the maxillary bone using CT (Computed Tomography) or the like. On the basis of this set value, the length of the drill blade 111 used for hole making is set.

The length of the drill blade 111 is generally about 10 mm. Here, the drill 110 is used in which the outer diameter of the shaft body 112 is larger than the outer diameter of the drill blade 111. This allows the depth of the pilot hole to be appropriately controlled because, upon hole making, when the end portion of the shaft body 112 on the drill blade 111 side touches the maxillary bone, the drill 110 does not drill deeper anymore.

Unlike the implant of an artificial tooth root, the implant of screws into the hard palate HP requires a plurality of thin screws 5 to be implanted within a narrow bowl-shaped (concave) non-planar (curved surface) area created by the hard palate HP in the oral cavity. Therefore, there is a need for more accurate control of the hole making direction for each hole making with the thin drill 110.

To align the hole making direction of each pilot hole, it is preferred to arrange the guide device 1, which has a plurality of guide frames 101 corresponding to a plurality of hole making positions, on the hard palate HP and insert the drill blade 111 into the guide sleeve 2 supported by any of the guide frames 101, thereby aligning the axial direction of the drill blade 111 with the hollow axis of the guide sleeve 2.

Here, in order for the guide sleeve 2 to function properly, it is necessary to slide the shaft body 112 positioned at the base of the drill blade 111 against the inner wall of the guide sleeve 2, and therefore the guide sleeve 2 has to have a length that exceeds the length of the drill blade 111 and project from the hard palate HP into the oral cavity.

As described previously, the length of the drill blade 111 is about 10 mm, so the projection height of the guide sleeve 2 is about 10 mm or more. For example, when the depth of bowl shape of the hard palate HP is 30 mm, the length of the drill device 100 including the drill 110 is at least 40 mm, therefore, in order to insert the drill blade 111 from the upper end of the guide sleeve 2 projecting in the oral cavity, a space of total length of 50 mm has to be provided above the hard palate HP. This requires the patient to open the mouth excessively, which will be a heavy burden on the patient.

In the implant of an artificial tooth root, it is necessary to control the hole making direction when increasing the diameter of the pilot hole. In this case, the axial length of the drill blade for grinding the inner surface of the pilot hole can be shortened, and therefore the guide sleeve does not project into the oral cavity unlike the case of drilling the hard palate HP.

(Drill Assistance Device)

To solve this problem inherent in drilling the hard palate HP (the projecting amount of the guide sleeve 2 is large), in the present embodiment, a drill assistance device A (see FIG. 1) is used, which includes the guide device 1 that serves as a drill guide device and the guide sleeve 2 that is fitted in the guide device 2 in an attachable and detachable manner.

The guide device 1 includes: the guide frame unit 10 that is arranged on the curved surface of the hard palate HP and formed by connecting a plurality of tubular guide frames to each other; the fixing members 20 to be capped on teeth of a patient; the connecting portions 30 that connect the guide frame unit 10 and the fixing members 20 and determine arrangement of the guide frame unit 10 on the curved surface with reference to the teeth; and the protruding portions 102 that protrude from portions of the guide frame unit 10 on the side opposite to the side facing the curved surface and each hold the guide sleeve 2 inserted in any of the holes 101h inside the guide frames 101.

The guide sleeve 2 includes: the tubular sleeve main body 21 having an inner diameter that allows the drill 110 to be inserted and an outer diameter that allows the sleeve main body 21 to be inserted in any of the holes 101h of the guide frames 101; the water injection slit 22 that is provided in a direction in which the sleeve main body 21 extends; and the projecting portions 23 that are provided on an outer peripheral surface of the sleeve main body 21 and are each fitted in any of the recessed portions 1021 provided in the protruding portions 102 when the sleeve main body 21 is inserted in any of the holes 101h.

In the drill assistance device A, the sum of the number of the recessed portions 1021 and the number of the projecting portions 23 may be three or more, and when the guide sleeve 2 is inserted in any of the guide frames 101, one of the recessed portions 1021 and one of the projecting portions 23 can be fitted to each other so that the water injection slit 22 faces the oral cavity vestibular side.

In such a drill assistance device A according to the present embodiment, the guide sleeve 2 is provided on the guide device 1 in an attachable and detachable manner without integrating the guide device 1 and the guide sleeve 2, and the drill 110 can be inserted into the guide sleeve 2 before the guide sleeve 2 is attached to the guide device 1. In this configuration, by attaching the guide sleeve 2 installed with the drill 110 to the guide device 1, the hollow axis of the guide sleeve 2 is aligned with the hollow axis of the guide frame 101, and the hole making direction of the drill 110 can therefore be aligned with the hollow axis direction of the guide frame 101.

In addition, the drill 110 and the guide sleeve 2 are attached to the guide frame 101 in a state in which the drill 110 is inserted in the guide sleeve 2; therefore, when the drill 110 is inserted into the guide frame 101, the insertion operation is not affected by the height of the guide sleeve 2, so that the patient does not need to open the mouth excessively, and the burden on the patient can be reduced.

The drill assistance device A may be provided with a plurality of the guide sleeves 2. Each guide sleeve 2 has the projecting portion 23. One guide sleeve 2 may be provided with a plurality of the projecting portions 23 or may also be provided with one projecting portion 23. In the case in which one guide sleeve 2 is provided with a plurality of the projecting portions 23, even when the guide sleeve 2 is inserted in any of the plurality of guide frames, one of the projecting portions 23 is fitted in one of the recessed portions 1021 of the protruding portions 102 without axially rotating the guide sleeve 2. Through this configuration, even when the guide sleeve 2 is inserted in any of the guide frames 101, the projecting portion 23 can be fitted in the recessed portion 1021 without changing the orientation of the guide sleeve 2.

Here, the attachment of the guide sleeve 2 to the guide device 1 has to be performed so that a state in which the water injection slit 22 provided by cutting out a part of the side surface of the guide sleeve 2 is positioned on the near side (facing the oral cavity vestibular side) is maintained during the hole making operation. In addition, in the guide device 1, the plurality of guide frames 101 to which the guide sleeve 2 can be attached in an attachable and detachable manner are arranged side by side because it is necessary to provide pilot holes at a plurality of adjacent positions in one operation. Therefore, the fitting portion (protruding portion 102) with the guide sleeve 2 provided on the guide frame 101 for one hole making position should not interfere with hole making at other positions.

To satisfy these requirements, it is preferred to provide the guide sleeve 2 with a plurality of plate-like projecting portions 23 that project from the side surface on which the water injection slit 22 is not provided and extend along the hollow axial direction of the guide sleeve 2. Each guide frame 101 is provided with the protruding portion 102 that protrudes in the hollow axial direction in a non-annular shape on the surface of the guide frame 101 opposite to the surface facing the hard palate HP, and this protruding portion 102 is provided with the recessed portion 1021 into which the projecting portion 23 of the guide sleeve 2 can be fitted.

In this configuration, for any of the guide frames 101, when the projecting portion 23 of the guide sleeve 2 is fitted into the recessed portion 1021 of the protruding portion 102 of the guide frame 101, it is realized that the water injection slit 22 of the guide sleeve 2 faces in a certain direction (to the oral cavity vestibular side).

In the drill assistance device A, when the protruding portions 102 are individually provided so as to be associated with respective ones of the plurality of guide frames 101, preferably none of the protruding portions 102 interferes with insertion of the guide sleeve 2 into the guide frames 101 that are not associated with the protruding portions 102. For example, when the guide device 1 is provided with a plurality of the guide frames 101, the protruding portion 102 associated with the guide frame 101 arranged on the left side is provided on the left side of the guide device 1, while the protruding portion 102 associated with the guide frame 101 arranged on the right side is provided on the right side of the guide device 1.

Through this configuration, even in the case in which the protruding portions 102 are individually provided so as to be associated with respective ones of the plurality of guide frames 101, when the guide sleeve 2 is inserted into the hole 101h of the guide frame 101, the guide sleeve 2 can be inserted into the guide frame 101 without interfering with the protruding portions 102 of other guide frames 101.

In the drill assistance device A, when the guide sleeve 2 has a plurality of the projecting portions 23, preferably all the recessed portions 1021 provided on the guide frame unit 10 can each be fitted to any of the projecting portions 23. This allows one of the projecting portions 23 to be fitted into the recessed portion 1021 without changing the orientation of the guide sleeve 2. Thus, if one guide sleeve 2 (or guide sleeves 2 of one type) is prepared, it is possible to constitute the drill assistance device A that allows the guide sleeve 2 to be fitted with all the recessed portions 1021.

(Screw Guide Device)

In the present embodiment, the protruding portion 102 provided for attaching the guide sleeve 2 in the drilling is also used to control the implanting depth of the screw 5 during the screw implanting step. This allows the guide device 1 to be used as a screw guide device B (see FIG. 9) not only for forming a pilot hole but also for implanting a screw.

That is, the screw guide device B includes the guide frame unit 10, the fixing members 20, the connecting portions 30, and one or more protruding portions 102, which has been previously described, and the screw retainer 3.

Specifically, the screw retainer 3 that retains the screw 5 to be implanted has the flange portion 32 in addition to the retainer main body 31 that retains the screws 5. The outer diameter of the flange portion 32 is larger than that of the retainer main body 31, and the flange portion 32 comes into contact with the protruding portion 102 midway the screw implanting operation.

The retainer main body 31 has the tubular fitting portion 311 into which the screw 5 is fitted from the tip side, and can be inserted into the hole 101h of the guide frame 101 in a state in which the screw 5 is fitted in the fitting portion 311. The flange portion 32 is provided from a position midway in the length direction of the retainer main body 31 so as to be able to come into contact with the protruding portion 102.

As the screw retainer 3 that retains the screw 5 moves to the hard palate HP side to some extent during the screw implanting, the flange 32 comes into contact with the protruding portion 102 that protrudes to a predetermined height. When the flange portion 32 comes into contact with the protruding portion 102, the screw retainer 3 can no longer approach the hard palate HP, but the rotation of the screw retainer 3 for tightening the screw is continued, and the implant of the screw 5 retained by the retainer main body 31 into the hard palate HP is continued without stopping. Then, when the implanting of the screw 5 progresses to some extent, the screw 5 is released from the fitting portion 311 and the implanting of the screw 5 stops. Thus, control of the implanting depth of the screw 5 is realized. Moreover, in a state in which the screw 5 is completely implanted, the screw 5 is automatically released from the fitting portion 311 of the screw retainer 3, and only the screw retainer 3 can be extracted from the guide frame 101.

(Orthodontic Tool Installation-Assisting Device Set)

The above-described guide device 1 and guide sleeve 2 are also configured as an orthodontic tool installation-assisting device set C (see FIGS. 1 and 9). That is, the orthodontic tool installation-assisting device set C has a configuration that includes: the guide device 1 that serves as a guide for the drill 110 that forms a plurality of pilot holes by drilling a curved surface of the hard palate HP having the curved surface, and as a guide that implants the screw 5 in each of the plurality of pilot holes; and the guide sleeve 2 that is fitted in the guide device 1 in an attachable and detachable manner.

(Hole Making Using Drill Having Thick Shaft Body)

FIGS. 14 to 17 are diagrams illustrating an example of hole making using a drill having a thick shaft body.

Figure 14A:
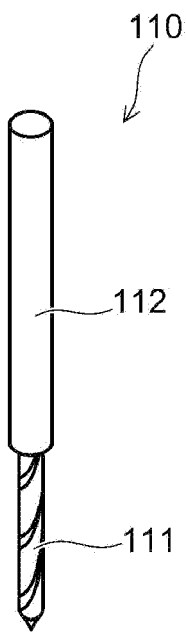
FIGS. 14(a) and 14(b) are diagrams illustrating an example of hole making using a drill having a thick shaft body.
Figure 14B:
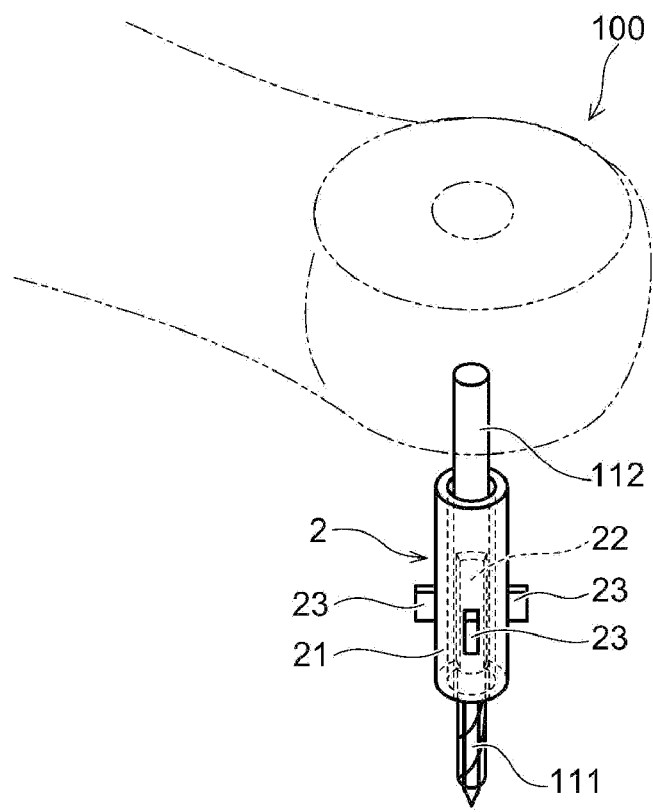

FIG. 14(*a*) illustrates a perspective diagram of the drill 110 having a thick shaft body 112. The outer diameter of the shaft body 112 of this drill 110 is larger than the outer diameter of the drill blade 111. FIG. 14(*b*) illustrates a perspective diagram of a state in which the drill 110 is inserted in the guide sleeve 2. The inner diameter of the guide sleeve 2 is slightly larger than the outer diameter of the shaft body 112 of the drill 110. In this configuration, the rotation and sliding of the drill 110 with respect to the guide sleeve 2 are not hindered.

Figure 15:
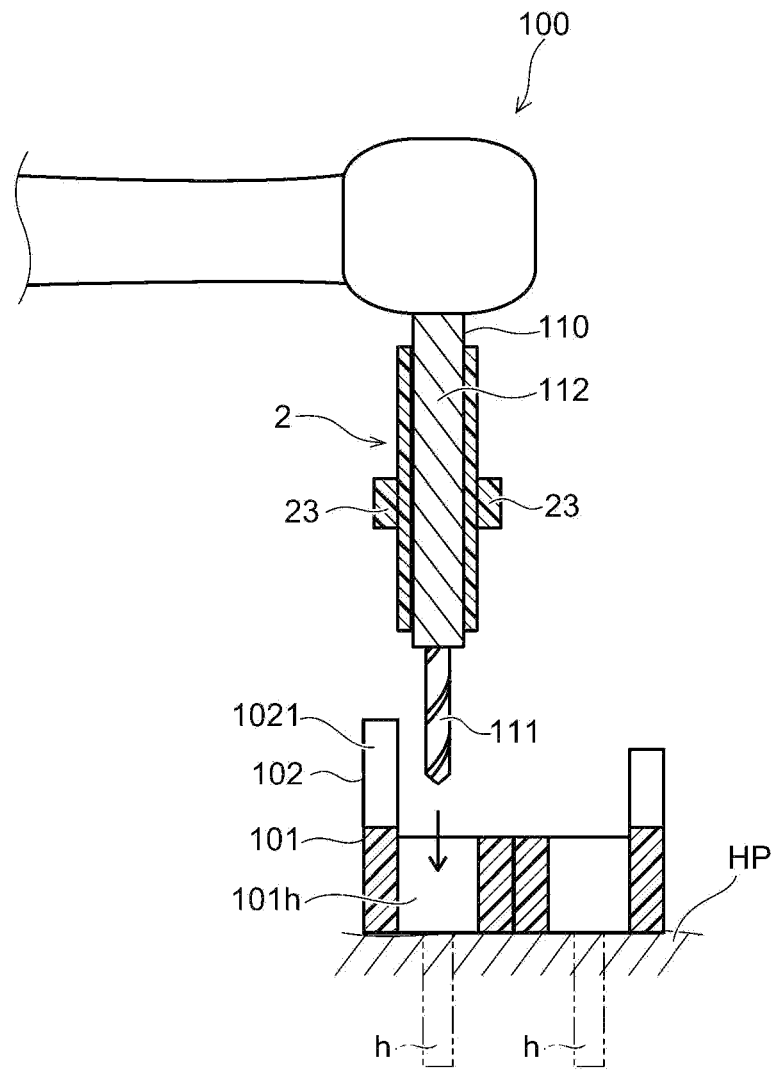
FIG. 15 is a diagram illustrating an example of hole making using a drill having a thick shaft body.

For hole making in the hard palate HP, first, as illustrated in FIG. 15, the drill 110 inserted in the guide sleeve 2 is positioned above the guide frame 101.

Figure 16A:
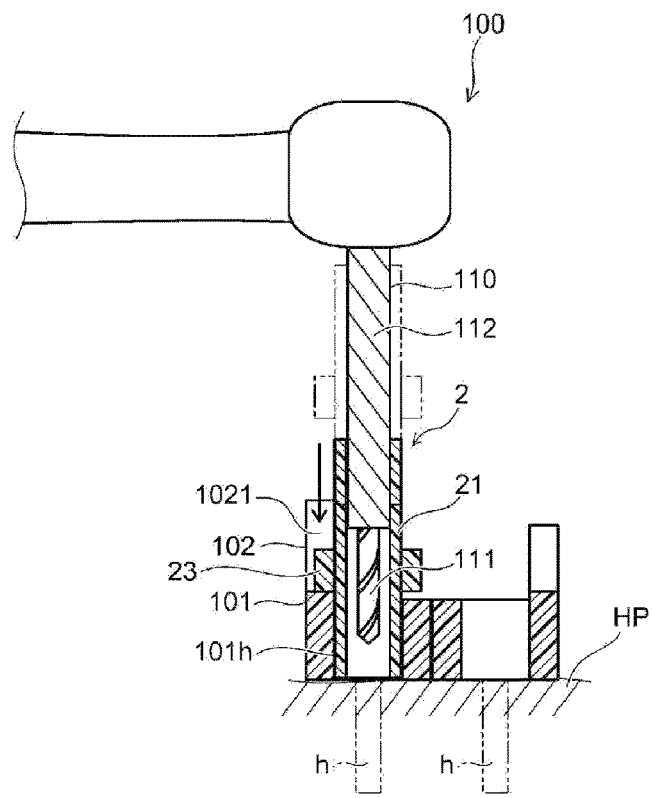
FIGS. 16(a) and 16(b) are diagrams illustrating an example of hole making using a drill having a thick shaft body.
Figure 16B:
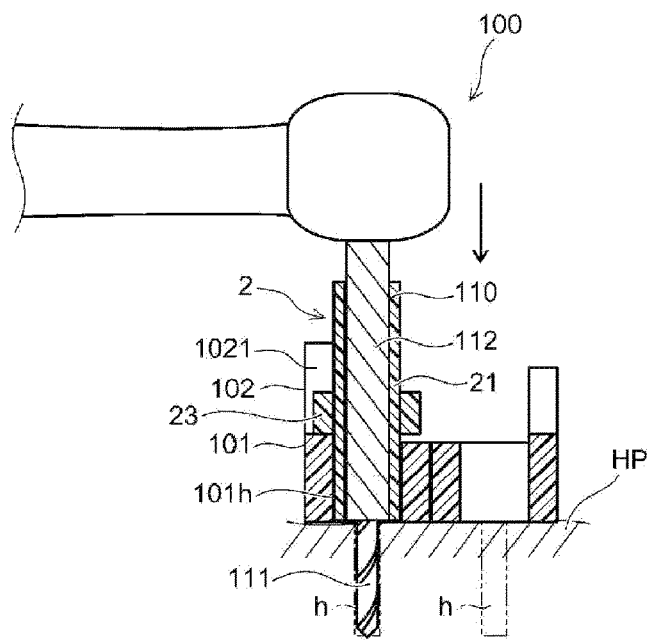

Then, as illustrated in FIG. 16(*a*), the drill 110 inserted in the guide sleeve 2 is inserted into the hole 101*h* of the guide frame 101 together with the guide sleeve 2. In this operation, the guide sleeve 2 is inserted upright into the hole 101*h* of the guide frame 101 prior to the drill 110. By fitting the projecting portion 23 of the guide sleeve 2 into the recessed portion 1021 provided in the protruding portion 102 of the guide frame 101, the position of the guide sleeve 2 (the position around the axis) is determined, so that the rotation of the guide sleeve 2 around the axis is suppressed and the orientation of the guide sleeve 2 is set (the water injection slit 22 is set to face the oral cavity vestibular side).

As the guide sleeve 2 is inserted into the hole 101*h* of the guide frame 101, the guide height of the drill 110 comes to a state of being increased due to the height of the guide sleeve 2. In this state, as illustrated in FIG. 16(*b*), the drill 110 is rotated and advanced along the guide sleeve 2 toward the hard palate HP side, and the drill blade 111 thereby drills the hole h. In this operation, since the shaft body 112 of the drill 110 is thicker than the drill blade 111, the insertion depth of the drill 110 is restricted at the position at which the end portion of the shaft body 112 on the drill blade 111 side comes into contact with the hard palate HP.

Figure 17:
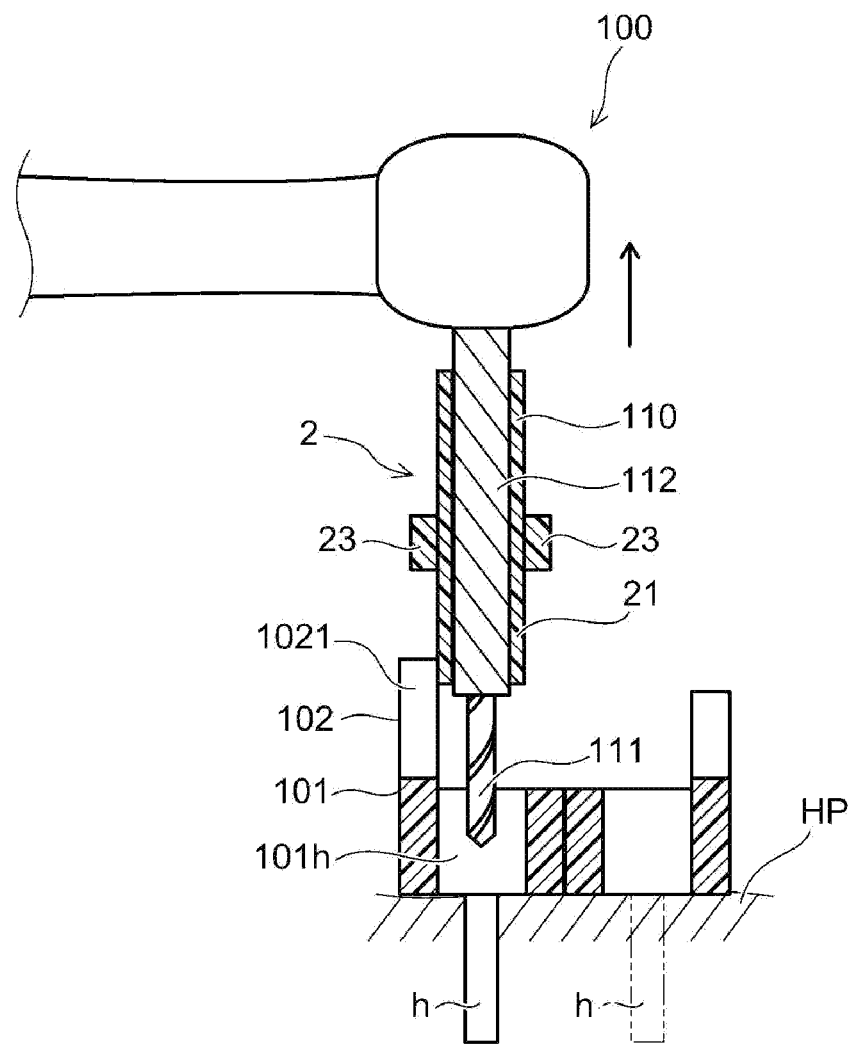
FIG. 17 is a diagram illustrating an example of hole making using a drill having a thick shaft body.

After making the hole h in the hard palate HP, as illustrated in FIG. 17, the drill 110 is extracted from the guide frame 101 together with the guide sleeve 2. When making the hole h at an adjacent hole making position, the drill 110 is inserted into the adjacent guide frame 101 together with the guide sleeve 2 in a state in which the drill 110 remains inserted in the guide sleeve 2. In this operation, even when the guide sleeve 2 is inserted into the adjacent guide frame 101 without changing the orientation of the guide sleeve 2, another projecting portion 23 of the guide sleeve 2 fits into the recessed portion 1021 of the protruding portion 102 of the adjacent guide frame 101, and the position of the guide sleeve 2 (the position around the axis) can be determined.

Thus, the hole making and screw implant in the hard palate HP, which is located on the upper center side (upper maxillary side) in the oral cavity and has a curved surface, is different from the hole making and screw implant in the alveolar bone, which is located relatively outside the mouth, and requires treatment at a position at which access to the drill device or auxiliary tool is very poor. In particular, when implanting a plurality of screws 5 in the bowl-shaped hard palate HP, the axial directions of pilot holes or the axial directions of the screw 5 are non-parallel. These axial angles differ depending on patients, and there is a limit to the size of the mouth that can be opened; therefore, the configuration for performing multiple hole making and multiple screw guiding with one guide device 1 is completely different from that for hole making and screw guiding for the alveolar bone.

In the present embodiment, in such a case of performing the hole making and screw implant in the hard palate HP having a curved surface, the guide device 1 and the guide sleeve 2 are separated from each other to accurately guide the drill even in a narrow treatment space, and it is possible to perform the treatment continuously from the hole making to the screw implant with the same guide device 1 attached. That is, the actions and effects unique to the present embodiment when performing the hole making and screw implant in the hard palate HP having such a curved surface can never be obtained by simply applying the configuration of a guide used when drilling into the alveolar bone.

Figure 18A:
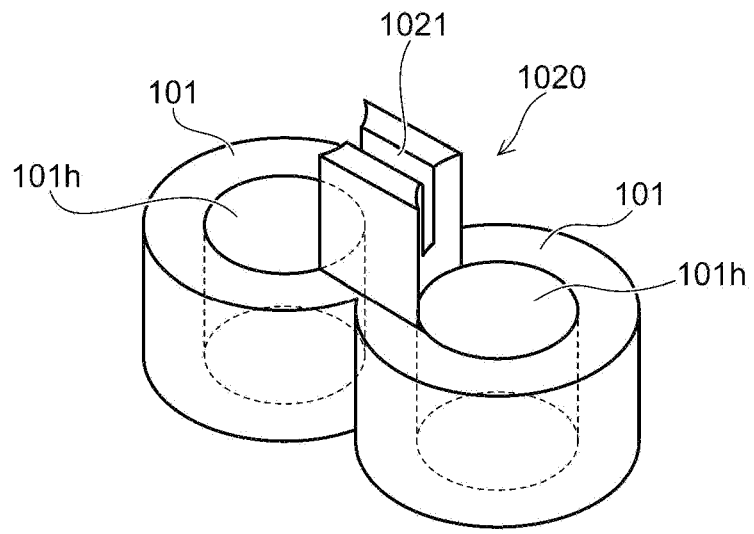
FIGS. 18(a) and 18(b) are perspective diagrams illustrating examples of shared protruding portions.
Figure 18B:
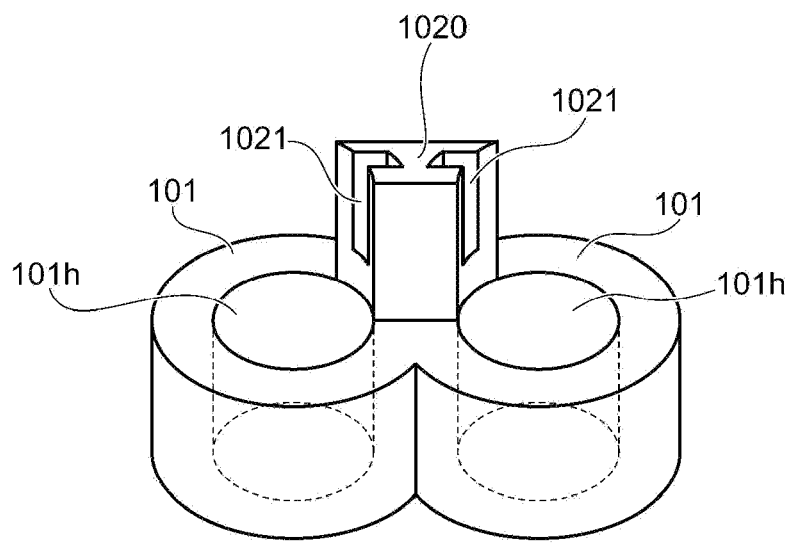

FIGS. 18(*a*) and 18(*b*) are perspective diagrams illustrating examples of shared protruding portions.

The shared protruding portions 1020 illustrated in FIGS. 18(*a*) and 18(*b*) are associated with a plurality of guide frames 101. For example, one shared protruding portion 1020 is provided for two adjacent guide frames 101.

The shared protruding portion 1020 illustrated in FIG. 18(*a*) is provided with one recessed portion 1021 communicating in the lateral direction. The shared protruding portion 1020 illustrated in FIG. 18(*b*) is provided with recessed portions 1021 on both sides without communicating with each other.

In such a case of using the shared protruding portion 1020, the guide frame 101 and the protruding portion 102 do not correspond one-to-one. By providing the shared protruding portion 1020 associated with the plurality of guide frames 101, the configuration of the guide frame unit 10 can be simplified.

Additionally or alternatively, the projecting portion 23 provided on the guide sleeve 2 may be a shared projecting portion that can be fitted into a plurality of the recessed portions 1021. That is, in the drill assistance device A and the orthodontic tool installation-assisting device set C, the sum of the number of the recessed portions 1021 and the number of the projecting portions 23 (including the shared projecting portions) may be three or more.

As described above, according to the embodiments, there can be provided the guide device 1, the guide sleeve 2, the drill device 100, the screw retainer 3, the drill assistance device A, the screw guide device B, and the orthodontic tool installation-assisting device set C with which it is possible to easily and accurately perform the hole making with the drill 110 and the implant of the screws 5, which are necessary when installing the screws 5 in an orthodontic implant device.

Although the present embodiments and their specific examples have been described above, the present invention is not limited to these examples. For example, in the present embodiments, an example in which the holes h are drilled from the hard palate HP to the maxillary bone and the screws 5 are implanted has been described, but the present invention can also be applied to a case in which the holes h are drilled at other locations in the oral cavity and the screws 5 are implanted. Moreover, the scope of the present invention encompasses those to which a person skilled in the art appropriately makes addition or removal of constitutional elements or design changes with respect to the previously-described embodiments or specific examples and those in which features of the embodiments are appropriately combined, provided that they have the subject matters of the present invention.

DESCRIPTION OF REFERENCE NUMERALS

1 Guide device
2 Guide sleeve
3 Screw retainer
5 Screw
6 Base member
7 Bolt
9 Auxiliary tool
10 Guide frame unit
20 Fixing member
21 Sleeve main body
21h Hole
22 Water injection slit
23 Projecting portion
23a First projecting portion
23b Second projecting portion
23c Third projecting portion
30 Connecting portion
31 Retainer main body
32 Flange portion
51 Threaded portion
52 Polygonal column head portion
53 Flange portion
61 Hole
62 Fixing portion
100 Drill device
101 Guide frame
101a First guide frame
101b Second guide frame
101c Third guide frame
101d Fourth guide frame
101h Hole
102 Protruding portion
102a First protruding portion
102b Second protruding portion
102c Third protruding portion
102d Fourth protruding portion
1020 Shared protruding portion
110 Drill
111 Drill blade
112 Shaft body
120 Holding mechanism
130 Rotating operation unit
201 Tooth-shaped recessed portion
201a First tooth-shaped recessed portion
201b Second tooth-shaped recessed portion
201c Third tooth-shaped recessed portion
311 Fitting portion
1021 Recessed portion
A Drill assistance device
B Screw guide device
C Orthodontic tool installation-assisting device set
HP Hard palate
T Tooth
T1 Right molar
T2 Left molar
T3 Right premolar
h Hole

The invention claimed is:

1. A drill assistance device comprising:
a drill guide device that serves as a guide for a drill when forming a plurality of holes from a curved surface of a hard palate having the curved surface; and
a guide sleeve that is fitted in the drill guide device in an attachable and detachable manner,
the drill guide device comprising:
a guide frame unit that is configured to be arranged on the curved surface and formed by connecting a plurality of tubular guide frames to each other, wherein each tubular guide frame has a hole inside;
a fixing member configured to be capped on a tooth of a patient;
a connecting portion that connects the guide frame unit and the fixing member and determines arrangement of the guide frame unit on the curved surface with reference to the tooth when in use; and
at least one protruding portion that protrudes from at least one portion of the guide frame unit on a side opposite to a side facing the curved surface and holds the guide sleeve inserted in any of the holes inside the guide frames,
the guide sleeve comprising:
a tubular sleeve main body having an inner diameter that allows the drill to be inserted and an outer diameter that allows the sleeve main body to be inserted in any of the holes of the guide frames;
a water injection slit that is provided in a direction in which the sleeve main body extends; and
projecting portions that are provided on an outer peripheral surface of the sleeve main body and are each fitted in at least one recessed portion provided in the at least one protruding portion when the sleeve main body is inserted in any of the holes of the guide frames,
wherein a sum of a number of the at least one recessed portion and a number of the projecting portions is three or more,
wherein when the guide sleeve is inserted in any of the guide frames, one of the at least one recessed portion and one of the projecting portions can be fitted to each other so that the water injection slit faces an oral cavity vestibular side.

2. The drill assistance device according to claim 1, wherein
the projecting portions are provided on the sleeve main body of at least one of a plurality of guide sleeves, and
even when the guide sleeve is inserted in any of the plurality of guide frames, one of the projecting portions is fitted in the recessed portion of the protruding portion without axially rotating the guide sleeve.

3. The drill assistance device according to claim 1, wherein
the protruding portion is individually provided so as to be associated with one of the plurality of guide frames, and
the protruding portion does not interfere with insertion of the guide sleeve into the guide frames that are not associated with the protruding portion.

4. The drill assistance device according to claim 3, wherein
provided that when the guide frame unit is viewed from above, the guide frame provided at a leftmost position is a first guide frame, the guide frame provided at a rightmost position is a second guide frame, the guide frame other than the first guide frame and the second guide frame is a third guide frame, the protruding portion provided on the first guide frame is a first protruding portion, the protruding portion provided on the second guide frame is a second protruding portion, and the protruding portion provided on the third guide frame is a third protruding portion,
the first protruding portion is arranged on a left side of the first guide frame, the second protruding portion is arranged on a right side of the second guide frame, and the third protruding portion is arranged on a far side of the third guide frame.

5. The drill assistance device according to claim 1, wherein the protruding portion has a shared protruding portion associated with two or more of the guide frames.

6. The drill assistance device according to claim 5, wherein the recessed portion of the shared protruding portion can be fitted to different ones of the projecting portions.

7. The drill assistance device according to claim 5, wherein the shared protruding portion has two or more recessed portions.

8. The drill assistance device according to claim 1, wherein the projecting portions have one or more shared projecting portions that can be fitted to two or more recessed portions.

9. The drill assistance device according to claim 1, wherein the guide sleeve has two or more of the projecting portions, and all recessed portions provided on the guide frame unit can each be fitted to any of the two or more of the projecting portions.

10. A screw guide device that serves as a guide for implanting a screw in a pilot hole provided in a curved surface of a hard palate having the curved surface, the screw guide device comprising:
a guide frame unit that is configured to be arranged on the curved surface and has a tubular guide frame;
a fixing member configured to be capped on a tooth of a patient;
a connecting portion that connects the guide frame unit and the fixing member and determines arrangement of the guide frame unit on the curved surface with reference to the tooth when in use;
one or more protruding portions that protrude from portions of the guide frame unit on a side opposite to a side facing the curved surface and restrict an implanting depth of the screw in the hard palate, the screw being implanted through a hole inside the guide frame; and
a screw retainer comprising: a retainer main body that has a tubular fitting portion for fitting the screw from a tip end side and can be inserted into the hole of the guide frame in a state in which the screw is fitted in the fitting portion; and a flange portion that is provided from a position midway in a length direction of the retainer main body so as to be able to come into contact with the protruding portion,
wherein a projection height of the protruding portion is set so that the screw is implanted in the hard palate at a predetermined depth when the flange portion of the screw retainer and the protruding portion come into contact with each other and fitting between the fitting portion and the screw is released to stop implant of the screw based on rotation of the retainer main body.

11. An orthodontic tool installation-assisting device set comprising:
a guide device that serves as a guide for a drill that forms a plurality of pilot holes by drilling a curved surface of a hard palate having the curved surface, the guide device also serving as a guide that implants a screw in each of the plurality of pilot holes;
a guide sleeve that is fitted in the guide device in an attachable and detachable manner; and
a screw retainer,
the guide device comprising:
a guide frame unit that is configured to be arranged on the curved surface and formed by connecting a plurality of tubular guide frames to each other, wherein each tubular guide frame has a hole inside;
a fixing member configured to be capped on a tooth of a patient;
a connecting portion that connects the guide frame unit and the fixing member and determines arrangement of the guide frame unit on the curved surface with reference to the tooth when in use; and
at least one protruding portion that protrudes from at least one portion of the guide frame unit on a side opposite to a side facing the curved surface and holds the guide sleeve inserted in any of the holes inside the guide frames,
the guide sleeve comprising:
a tubular sleeve main body having an inner diameter that allows the drill to be inserted and an outer diameter that allows the sleeve main body to be inserted in any of the holes of the guide frames;
a water injection slit that is provided in a direction in which the sleeve main body extends; and
projecting portions that are provided on an outer peripheral surface of the sleeve main body and are each fitted in at least one recessed portion provided in the at least one protruding portion when the sleeve main body is inserted in any of the holes of the guide frames,
wherein a sum of a number of the at least one recessed portion and a number of the projecting portions is three or more,
wherein when the guide sleeve is inserted in any of the guide frames, one of the at least one recessed portion and one of the projecting portions can be fitted to each other so that the water injection slit faces an oral cavity vestibular side,
wherein the screw retainer comprises:
a retainer main body that has a tubular fitting portion for fitting the screw from a tip end side and can be inserted into any of the holes of the guide frames in a state in which the screw is fitted in the fitting portion; and a flange portion that is provided from a position midway in a length direction of the retainer main body so as to be able to come into contact with the protruding portion, wherein a projection height of the protruding portion is set so that the screw is implanted in the hard palate at a predetermined depth when the flange portion of the screw retainer and the protruding portion of the guide device come into contact with each other and fitting between the fitting portion and the screw is released to stop implant of the screw based on rotation of the retainer main body.

* * * * *